United States Patent [19]
Sato et al.

[11] Patent Number: 4,787,219
[45] Date of Patent: Nov. 29, 1988

[54] SPATIAL WARP KNITTED STRUCTURE AND A METHOD OF MANUFACTURING THE SAME

[75] Inventors: Seizo Sato; Kazuo Furuya, both of Otsu, Japan

[73] Assignee: Asahi Kasei Kogyo Kabushiki Kaisha, Osaka, Japan

[21] Appl. No.: 73,844

[22] Filed: Jul. 15, 1987

Related U.S. Application Data

[63] Continuation of Ser. No. 898,635, Aug. 21, 1986.

[30] Foreign Application Priority Data

Aug. 22, 1985 [JP] Japan .................. 60-182989
Sep. 17, 1985 [JP] Japan .................. 60-203415

[51] Int. Cl.⁴ .................................. D04B 7/12
[52] U.S. Cl. .................................. 66/190; 66/192; 66/196; 66/87
[58] Field of Search .................. 66/190-196, 66/87

[56] References Cited

U.S. PATENT DOCUMENTS

| | | | |
|---|---|---|---|
| 393,185 | 11/1888 | Stowe | 66/196 X |
| 628,818 | 7/1899 | Koch | 66/196 |
| 2,249,650 | 7/1941 | Foster | 66/202 X |
| 2,682,163 | 6/1954 | Staff et al. | 66/208 |
| 3,646,782 | 3/1972 | Kohl | 66/87 |
| 3,665,733 | 5/1972 | Jackson | 66/87 |
| 3,864,944 | 2/1975 | Jackson | 66/87 |
| 4,399,671 | 8/1983 | Henningsson | 66/196 |

FOREIGN PATENT DOCUMENTS

160262 1/1964 U.S.S.R. .................. 66/87

OTHER PUBLICATIONS

Wheatley, "CO-WE-NIT", Part 1,2,3 section 2, Knitted Outerwear Times 6/17/68 pp. 47-54; 7/1/68 pp. 41-47; 9/16/1968 pp. 61-67, vol. 37, No. 26, vol. 37, No. 28, vol. 37, No. 39.

*Primary Examiner*—Ronald Feldbaum
*Attorney, Agent, or Firm*—Finnegan, Henderson, Farabow, Garrett & Dunner

[57] ABSTRACT

Novel spatial warp knitted structures are knitted on a double needle bar Raschel machine or a spatial warp knitting machine formed by modifying a double needle bar Raschel machine. A basic spatial warp knitted structure including two warp knitted fabrics facing each other, uniting threads uniting the two warp knitted fabrics, and insert warp threads and/or insert weft threads inserted between and in parallel to the two warp knitted fabrics so as to intersect the uniting threads or to be interlaced with the uniting threads. In practical application, the basic spatial warp knitted structure is modified by properly interlacing the insert warp threads and/or the insert weft threads with the uniting threads and by forming the warp knitted fabrics in a specific warp knitted construction, into a spatial warp knitted bank structure, a spatial warp knitted board structure having a hollow rectangular cross-section or a hollow segmental rectangular cross-section, a spatial warp knitted honeycomb structure, a spatial warp knitted honeycomb board structure, a spatial warp knitted skeleton structure comprising an assembly of cuboidal frames, or a spatial warp knitted structure having an I-shaped section, a Y-shaped section, or a T-shaped section.

18 Claims, 25 Drawing Sheets

(a)

(b)

(c)

SPATIAL WARP KNITTED STRUCTURE AND A METHOD OF MANUFACTURING THE SAME

This application is a continuation of application Ser. No. 06/898,635, filed Aug. 21, 1986.

BACKGROUND OF THE INVENTION

1. Field of the Invention

The present invention relates to a special spatial warp knitted structure produced by warp-knitting a textile, a method of manufacturing the same, and a warp knitting machine for knitting the same, more specifically to a novel spatial warp knitted structure incorporating insert threads or a simulated woven structure and knitted on a warp knitting machine having two needle bars, such as a double needle bar Raschel machine, or a special warp knitting machine developed through the modification of a double needle bar warp knitting machine, a method of manufacturing practical spatial warp knitted structures based on such a spatial warp knitted structure incorporating laid-in threads or a simulated woven structure, and a special warp knitting machine capable of knitting such a novel spatial warp knitted structure.

2. Description of the Related Art

In recent years, composite materials comprising textiles have been applied to many fields including daily commodities and utensils, not to mention aeronautics and military fields for the purpose of weight reduction, toughness enhancement, shock absorption, heat insulation, and/or sound isolation.

From the functional point of view, textiles are used often in a spatial structure, typically represented by a honeycomb structure, to meet the purposes. However, ordinary flat textile structures as woven or as knitted cannot be used to form a spatial structure. Accordingly, in constructing a honeycomb structure, for instance, by ordinary flat fabrics having the shape of a sheet, the flat fabrics are turned into corrugated fabrics by means of corrugated rollers, and then the corrugated fabrics are joined adhesively in a parallel, layered arrangement, or layers of fabrics are joined in a parallel, layered arrangement, or layers of fabrics superposed one over another are joined adhesively at bonding points distributed in a three-dimensional, zigzag pattern, and then the layers of the fabrics thus bonded are expanded in a spatial structure. However, such a method of constructing a spatial structure requires complicated processes, and the spatial structure thus formed involves a problem that the layers of fabrics are liable to separate from each other.

In view of such difficulties, a compound fabric formed by adhesively bonding flat woven fabrics superposed one over another, or a multiple layer fabric consisting of several distinct woven fabrics united by threads of warp or weft passing across the adjacent distinct woven fabrics, has been used.

U.S. Pat. No. 4,183,232 discloses a method of knitting a spatial textile structure on a circular knitting machine.

A laminated and adhesively bonded fabric structure can easily be increased in thickness; however, such a fabric structure requires much time and labor for manufacture and has insufficient shearing strength, although the tensile strength thereof is high, because such a fabric structure does not have threads extending in the direction of the thickness. A multilayer fabric consisting of several distinct woven fabrics united by threads of warp or weft passing across the adjacent distinct woven fabrics has sufficient shearing strength; however, the thickness of such a multiplier fabric is limited. U.S. Pat. No. 4,183,232 discloses a spatial knitted structure having threads respectively extending in three-dimensional directions. However the conformation of the spatial knitted structure is limited to either a cylindrical shape or a conical shape. Furthermore, since the vertical threads of this spatial knitted structure are inserted in a separate process, it is difficult to construct the spatial knitted structure in a high textile density.

Another known spatial knitted structure is knitted on a warp knitting machine, such as a double Raschel machine equipped with two needle bars. This known spatial knitted structure is formed, as illustrated in FIG. 1 by way of example, by uniting two distinct knitted fabrics 7 and 7' respectively consisting of loops 1 and 1' with uniting threads 2. This spatial knitted structure is divided into two individual pile fabrics by cutting the uniting threads, and the pile fabrics are used widely for the upholstery of automotive seats and blankets; however, the application of the spatial knitted structure as knitted to industrial materials has never been proposed. However, this known spatial knitted structure has a problem in industrial application that, although the strength along the wale and course is high enough, the compressive strength thereof is very low, and is unsatisfactory in three-dimensional appearance due to its limited thickness.

SUMMARY OF THE INVENTION

The present invention solves the problems in the above-mentioned conventional spatial knitted structure by inserting threads between the distinct component knitted fabrics. A spatial knitted structure thus formed has never been known. The present invention is capable of being embodied in various spatial knitted structures, such as a spatial knitted structure incorporating a simulated woven structure, spatial knitted band structure, a spatial knitted structure having a special sectional shape, such as Y-shape, I-shape, square shape, or honeycomb shape, and a spatial skeleton knitted structure in the shape of a square frame, by selectively determining the condition of intersection of the insert threads and the uniting threads. Such special spatial knitted structures have never been known.

Furthermore, a method of constructing such special spatial knitted structures and novel knitting machine for knitting the same have never been known.

Accordingly, it is a first object of the present invention to provide a spatial warp knitted structure constructed by inserting threads in a known spatial warp knitted structure consisting of two distinct knitted fabrics united together with uniting threads, and having balanced longitudinal, transverse, and perpendicular compressive strengths, and a method of manufacturing such a spatial warp knitted structure. This spatial warp knitted structure of the present invention can be developed in various structural morphologies by varying the condition of interlacing the uniting threads and the insert threads.

It is a second object of the present invention to provide a spatial warp knitted structure of the simulated woven type having raised portions formed by interlacing the uniting threads and the insert warps and/or wefts, and a method of manufacturing the spatial warp knitted structure of the simulated woven type. This spatial warp knitted structure of the simulated woven type is capable of being developed in the following spatial warp knitted structures as representative embodiments.

(1) Spatial warp knitted band structure

Simulated, raised woven structures are incorporated into the two component warp knitted fabrics by interlacing the uniting threads only with the insert warps. This spatial warp knitted structure has the shape of a band.

(2) Special section spatial warp knitted structure

This special section spatial warp knitted structure is similar to the foregoing spatial warp knitted band structure, except that the mode of interlacement of the uniting threads and the insert warps is varied to construct a spatial warp knitted structure having a special section, such as I-shaped section, Y-shaped section, or honeycomb-shaped section.

(3) Special section spatial warp knitted board structure

This structure is formed by partially uniting the two component knitted fabrics of a spatial warp knitted structure of the simulated woven type with uniting threads. Similarly to the foregoing special section spatial warp knitted structure of (2), this special section spatial warp knitted structure can be formed in a board shape having an I-shaped or square section, or in a honeycomb structure by selectively determining the mode of interlacement of the uniting threads and the insert warp threads.

(4) Spatial warp knitted skeleton structure

This structure has the shape of a spatial frame. In constructing this structure, the pillar stitches of the two component knitted fabrics are arranged at intervals, only the opposite ends of the pillar stitches are interconnected with the uniting threads, and insert warps and wefts are inserted at regular intervals and are interlaced with the uniting threads.

It is a third object of the present invention to provide a method of manufacturing a novel spatial warp knitted structure and various novel spatial warp knitted structures derived from the basic, novel spatial warp knitted structure.

It is a fourth object of the present invention to provide a knitting machine for knitting a novel spatial warp knitted structure and various, novel spatial warp knitted structures derived from the basic, novel spatial warp knitted structure.

DESCRIPTION OF THE PREFERRED EMBODIMENTS

Preferred embodiments of the present invention will be described hereinafter with reference to the accompanying drawings.

Figure 3:
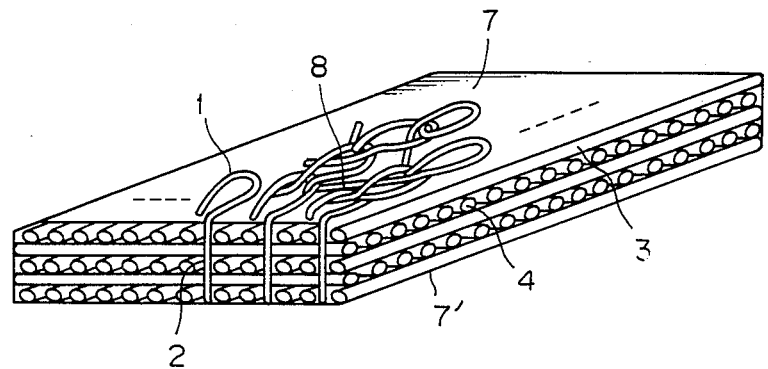
FIG. 3 is a perspective view of a spatial warp knitted structure in a preferred embodiment according to the present invention.

Referring to FIG. 3, showing a basic spatial warp knitted structure according to the present invention, the basic spatial warp knitted structure has a front warp knitted fabric 7 and a back warp knitted fabric 7'. The warp knitted fabric 7 and 7' may be constituted with two wales of loops. The stitch design of the warp knitted fabrics 7 and 7' may be a tricot stitch having wales of loops 1 interconnected with each other by loops 8 or chain stitch having wales of loops 1 interconnected with inlaid threads.

Figure 5:
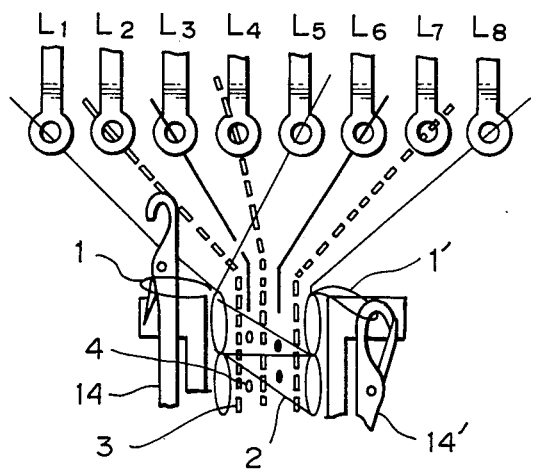
FIG. 5 is a schematic illustration of the knitting section of a double needle bar warp knitting machine.

Referring to FIG. 5, in forming either the front warp knitted fabric 7 or the back warp knitted fabric 7' in the former stitch design, guide bars $L_1$ and $L_5$ among guide bars $L_1$ to $L_8$ are used for forming the loops 1 and the guide bar $L_1$ is used for forming the connecting loop 8. In forming the warp knitted fabrics 7 and 7' in the latter stitch pattern, only the guide bar $L_5$ is used for supplying a thread to needles 14 and 14' to form the loops 1 and 1', and the wales of the loops 1 and 1' may be interconnected by inlaid threads.

The front warp knitted fabric 7 and the back warp knitted fabric 7' are knitted synchronously in the same stitch pattern. The loops 1' of the back warp knitted fabric 7' (FIG. 4) are formed by using the guide bars $L_5$ and $L_6$. Thus, the spatial warp knitted structure of the present invention has at least two warp knitted fabrics 7 and 7'.

Referring again to FIG. 3, the warp knitted fabrics 7 and 7' are united with uniting threads 2. The uniting threads 2 as knitted extend substantially perpendicularly to the warp knitted fabrics 7 and 7'. The uniting threads 2 may be used for both uniting the front and back warp knitted fabrics 7 and 7' and forming the loops 1 and 1', or only for uniting the front and back warp knitted fabrics 7 and 7'.

Figure 4:
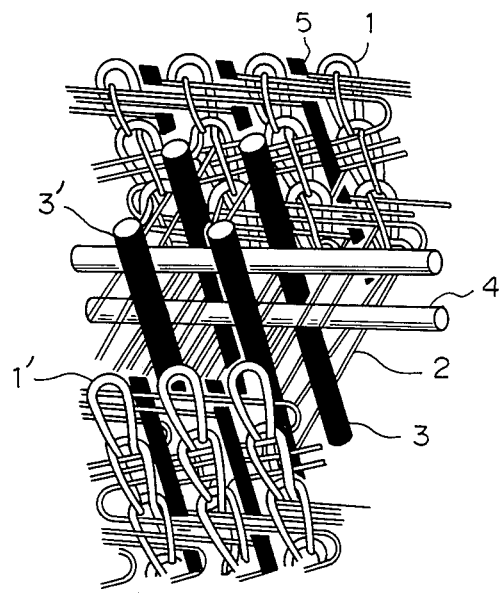
FIG. 4 is a fragmentary perspective view of assistance in explaining the construction of a spatial warp knitted structure in a preferred embodiment according to the present invention.

Referring to FIG. 4, the uniting threads 2 are used for both uniting the front and back warp knitted fabrics 7 and 7' and forming the loops 1 and 1'. Two rows of insert warp threads 3 and 3' are inserted along the wales substantially perpendicularly to the uniting threads 2 between the front and back warp knitted fabrics 7 and 7'. A row of insert weft threads 4 is inserted along the courses substantially perpendicularly to the uniting threads 2 between the rows of the insert warp threads 3 and 3'.

Preferably, the insert warp threads 3 and 3' or the insert weft threads 4 are inserted substantially perpendicularly to the uniting threads 2 as illustrated in FIG. 4. However, the present invention requires that the insert warp threads 3 and 3' or the insert weft threads 4 be extended at an angle to the uniting threads 2 within the space between the front and back warp knitted fabrics 7 and 7', and hence the insert warp threads 3 and 3' or the insert weft threads 4 may be extended diagonally to the uniting threads 2.

It is desirable to provide the spatial warp knitted structure with diagonal insert threads in addition to the insert warp and weft threads inserted substantially perpendicularly to the uniting threads to give the spatial warp knitted structure three-dimensionally isotropic performance. The arrangement of the insert threads may be determined appropriately according to the purpose of the spatial warp knitted structure.

The thickness of the spatial warp knitted structure can be increased by increasing the number of rows of the insert warp threads and/or the insert weft threads or by increasing the thickness of the insert warp threads and/or the insert weft threads.

Only one row of the insert warp threads 3 or only one row of the insert weft threads 4 may be arranged between the front and back warp knitted fabrics 7 and 7', or a combination of a plurality of the insert warp threads and a plurality of the insert weft threads may be arranged between the front and back warp knitted fabrics 7 and 7'. However, according to the present invention, at least one row of either the insert warp threads or the insert weft threads must be arranged between the front and back warp knitted fabrics 7 and 7'.

Figure 1:
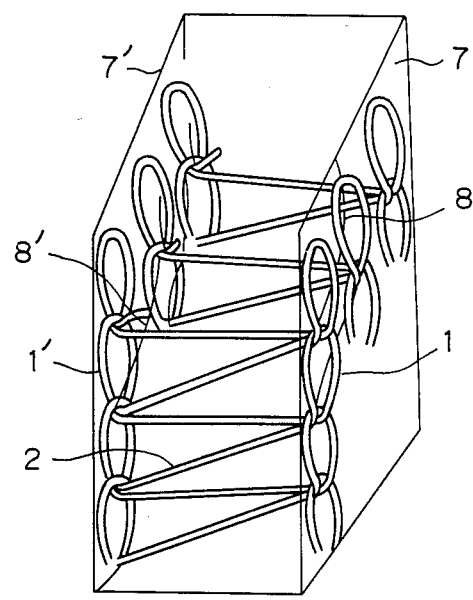
FIG. 1 is a fragmentary perspective view showing the construction of a conventional spatial warp knitted structure.
Figure 2:
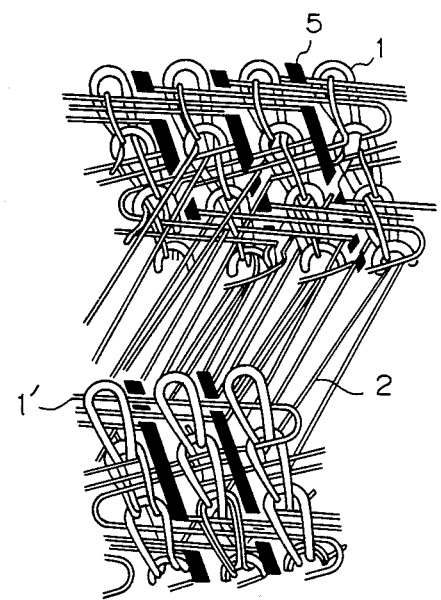
FIG. 2 is a fragmentary perspective view of assistance in explaining the construction of a conventional spatial warp knitted structure.

Referring now to FIG. 2, a conventional spatial warp knitted structure comprises insert warp threads 5 inserted between the wales of the respective loops 1 and 1' of front and back warp knitted fabrics instead of between the front and back warp knitted fabrics. On the other hand, the spatial warp knitted structure according to the invention comprises the insert warp threads inserted between the front and back warp knitted fabrics, which is entirely different from the conventional spatial warp knitted structure.

According to the present invention, in some cases, a cycle of insertion of insert warp threads between the front and back warp knitted fabrics and insertion of the same insert warp threads in either the front or the back warp knitted fabric is repeated. For example, a cycle of insertion of insert warp threads between the front and back warp knitted fabrics across a distance corresponding to five courses or above and insertion of the same insert warp threads in either the front or back warp knitted fabric across a distance corresponding to the subsequent one course is repeated. This mode of insert warp thread insertion is regarded substantially as insertion of the insert warp threads between the front and back warp knitted fabrics. However, when the distance of insertion of insert warp threads corresponding to four courses or less, the strength of the spatial warp knitted structure with respect to three-dimensional directions, namely, directions along the length, width, and thickness, is unbalanced, although the mechanical properties of the front and back warp knitted fabrics of the spatial warp knitted structure change. Such unbalance of the strength is undesirable. Both the insert warp threads and the insert weft threads need not necessarily be inserted regularly. The insert warp threads may be inserted in any mode provided that the insert warp threads are inserted continuously between the front and back warp knitted fabrics across a distance corresponding to five courses or above. The insert weft threads may be inserted across the entire width of the spatial warp knitted structure or may be inserted zigzag across at least two wales, preferably five wales or above to enhance the reinforcing effect of the insert weft threads.

A method of manufacturing a spatial warp knitted structure, according to the present invention will be described with reference to FIGS. 5 and 6. In FIG. 5, guide bars $L_1$ to $L_8$ are each represented by a guide.

Referring to FIG. 5, the guide bar $L_5$ guides threads to two sets of needles 14 and 14′ to form loops 1 and 1′ and uniting threads 2. The guide bar $L_1$ guides threads to the needles 14 to reinforce the loops 1 and to interconnect the wales of loops. Similarly, the guide bar $L_8$ guides threads to the needles 14′ to reinforce the loops 1′. Insert warp threads 3 are supplied through the guide bars $L_2$, $L_4$ and $L_7$. The guide bars $L_2$, $L_4$ and $L_7$ do not have overlapping motion relative to the needles 14 and 14′, and hence the guide bars $L_2$, $L_4$, and $L_7$ do not guide the threads to the hook of the needles 14 and 14′. Thus, the insert warp threads 3 are inserted substantially perpendicularly to the uniting threads 2 by repeating the knitting cycle. Insert weft threads 4 are inserted through the guide bars $L_3$ and $L_6$, which do not have overlapping motion and do not guide the threads to the hook of the needles 14 and 14′. The combination of the movement of the guide bars $L_3$ and $L_6$ from the needles 14 to the opposite needles 14′ and the transverse movement of the same across a plurality of wales enables zigzag insertion of the threads across the uniting threads 2. According to the method of the present invention, the guide bars $L_3$ and $L_6$ are traversed desirably across five wales or above, namely, five needles or above. In a stitch design shown in FIG. 6, the guide bars $L_3$ and $L_6$ are traversed across six needles to insert the insert weft threads 4 in a zigzag pattern across six wales.

The spatial warp knitted structure of the present invention is knitted on a double needle bar warp knitting machine, such as a double needle bar Raschel machine or a double needle bar tricot machine. As illustrated in FIG. 5, the double needle bar warp knitting machine has two sets of needles 14 and 14′ disposed opposite to each other. The two sets of needles 14 and 14′ are controlled alternately for knitting motion.

A spatial warp knitted structure of the simulated woven type according to the present invention will be described hereinafter. Basically, this spatial warp knitted structure of the simulated woven type is similar to the foregoing basic spatial warp knitted structure, except that the insert warp threads and/or the insert weft threads, at least the insert warp threads in one row, are interlaced with the uniting threads in a simulated woven structure. The threads for forming the loops of the front and back warp knitted fabrics or additional individual threads may be used as the uniting threads. That is, the uniting threads may form the loops of the front and back warp knitted fabrics and unite the front and back warp knitted fabrics, or may be simply interlaced with the loops of the front and back warp knitted fabrics. The terms "uniting thread", "uniting space", and "uniting part" do not include portions of the uniting threads substantially included in the front and back warp knitted fabrics.

Figure 7:
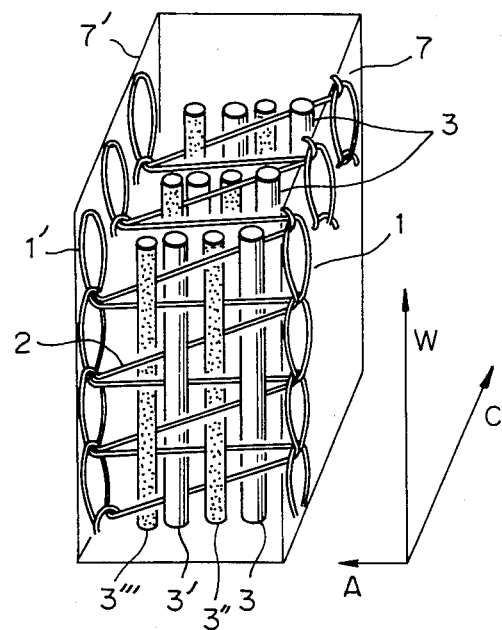
FIG. 7 is a fragmentary perspective view of assistance in explaining a spatial warp knitted structure of the simulated woven type in a preferred embodiment according to the present invention.

FIG. 7 illustrates the construction of a spatial warp knitted structure of the simulated woven type in a preferred embodiment according to the present invention. The spatial warp knitted structure has a front warp knitted fabric consisting of loops 1, and a back warp knitted fabric consisting of loops 1′. The loops 1 and 1′ are formed in chain stitch (continuous loops along the direction of arrow W), while the wales of the loops are not interconnected (in the direction of arrow C).

In another embodiment of the spatial warp knitted structure of the simulated woven type has wales interconnected with additional inlaid threads or with the threads forming the loops.

Referring to FIG. 7, the front and back warp knitted fabrics 7 and 7′ are united with uniting threads 2 extending substantially perpendicularly to the front and back warp knitted fabrics 7 and 7′. The uniting threads 2 unites the front and back warp knitted fabrics 7 and 7′ with a uniform gap therebetween and also forms the loops 1 and 1′. Incidentally, in FIG. 7, an arrow A indicates the direction of thickness of the spatial warp knitted structure, arrow C the direction along course, and arrow W along wale.

There is no particular restriction on the mode of uniting the front and back warp knitted fabrics. However, in view of knitting facility, it is preferable to unite the loops of the front warp knitted fabric with the corresponding loops of the back warp knitted fabric when the threads forming the loops are used also for uniting the front and back warp knitted fabrics. When additional uniting threads are used, the uniting mode is optional, provided that the front and back warp knitted fabrics are united together substantially with a uniform gap therebetween. Increase in the density of the uniting threads enhances the stability of unity of the front and back warp knitted fabrics, which is preferable from the viewpoint of reinforcement of the front and back warp knitted fabrics. Excessively large intervals between the uniting parts reduces the compressive strength of the structure. Desirably, the intervals between the uniting parts along the wale are not more than four courses, while the intervals between the uniting parts along the course is optional but dependent on the construction of the spatial warp knitted structure.

The most significant feature of the spatial warp knitted structure of the simulated woven type is the interlacement of the insert warp threads of at least one row with the uniting threads 2. As illustrated in FIG. 7, the insert warp threads 3 and 3′ are inserted through the uniting parts substantially perpendicularly to the uniting threads 2. In the spatial warp knitted structure of the simulated woven type of FIG. 7, insert warp threads 3, 3′, 3″ and 3‴ are inserted in four rows. The number of rows of the insert warp threads dependent on the purpose of the spatial warp knitted structure of the simulated woven type. The greater the number of rows of the insert warp threads, the greater the thickness of the structure, the greater the strength of the structure, the greater the compressive strength of the structure and the greater the resistance of the structure to damage and abrasion.

There is no particular restriction on the mode of interlacement of the insert warp threads 3, 3', 3", and 3''' with the uniting threads 2. The insert warp threads may pass alternately on one side and the other side of the uniting threads 2 every other uniting thread 2, every two uniting threads 2, or every 10 courses or more. What is essential is that the insert warp threads be interlaced with the uniting threads in a woven design. When the insert warp threads are inserted in a plurality of rows, a simulated woven structure may be formed by staggering the insert warp threads of one row and those of another in opposite directions with respect to each other. In FIG. 7, the insert warp threads 3 and the insert warp threads 3' are staggered opposite to each other.

Figure 8:
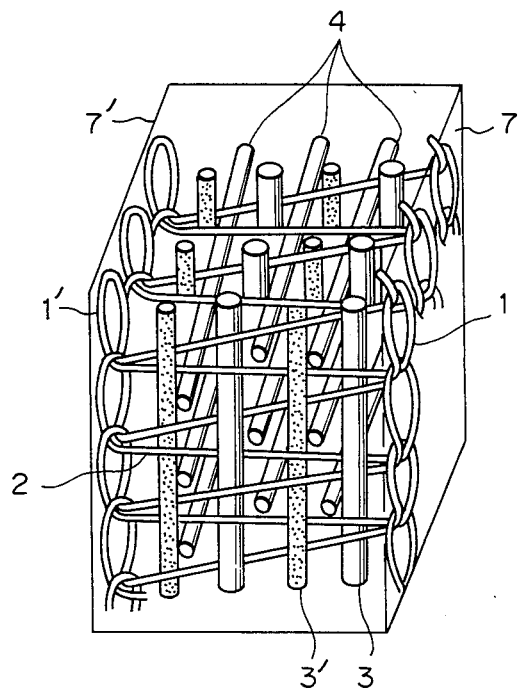
FIG. 8 is a fragmentary perspective view of a spatial warp knitted structure of the simulated woven type in another embodiment according to the present invention.

FIG. 8 illustrates the construction of another embodiment of the spatial warp knitted structure of the simulated woven type. In this embodiment, in order/to improve the isotropic performance of the spatial warp knitted structure of the simulated woven type, three rows of insert weft threads 4 are inserted substantially perpendicularly to uniting threads 2 in the weft direction (along the course). In view of restrictions on the mechanism of the warp knitting machine, the insert weft threads 4 need not necessarily be interlaced with the uniting threads 2. Although the mode of insertion of the insert weft threads 4 is optional, it is desirable to insert the insert weft threads 4, similarly to the insert warp threads, linearly in parallel to the front and back warp knitted fabrics 7 and 7' in a plurality of rows. The insert weft threads 4 may be inserted either across the entire knitting width or across several wales, at least two wales and preferably not less than five wales to enhance the effect of reinforcing the strength of the structure along the course.

The spatial warp knitted structure of the simulated woven type of the present invention is knitted by repeating, for example, the following series of knitting motions. In forming a first course, the warp inserting guides make swing-in motion through the spaces between the front needles, make swing-out motion through the same spaces to return to the original position, make swing-in motion through the spaces between the back needles, and then make swing-out motion through the same spaces between the back needles to return to the original position. Then, in forming the next course, the warp inserting guides shift sideways for underlapping motion across needle spaces greater than those of the underlapping motion of the uniting thread guides, make swing-in motion through the spaces between the front needles, make swing-out motion through the same spaces to return to the original position, make swing-in motion through the spaces between the back needles, make swing-out motion through the same spaces between the back needles, and then shift sideways for underlapping motion in a direction opposite the direction of the preceding underlapping motion, to return to the initial position. Thus, in forming the first course, the insert warp threads are positioned on one side of the uniting threads and, in forming the next course, the insert warp threads are positioned on the other side of the uniting threads, respectively, so that the insert warp threads and the uniting threads are interlaced in a simulated woven structure.

Another method of knitting the spatial warp knitted structure of the simulated woven type will be described hereinafter. This method constructs a compact simulated woven structure of the uniting threads and the insert warp threads.

In the method, vertical rows of uniting threads are formed at regular intervals along the course in a density of N rows per unit length, while a plurality of insert warp threads are associated with each vertical row of the uniting threads. Pairs of the insert warp threads are shifted alternately to one side and to the other side of the vertical row of the uniting threads to interlace the pairs of insert warp threads with the uniting threads of each vertical row so that a plain weave structure is constructed by each row of the uniting threads and the pairs of the insert warp threads between the front and back warp knitted fabrics.

Figure 9:
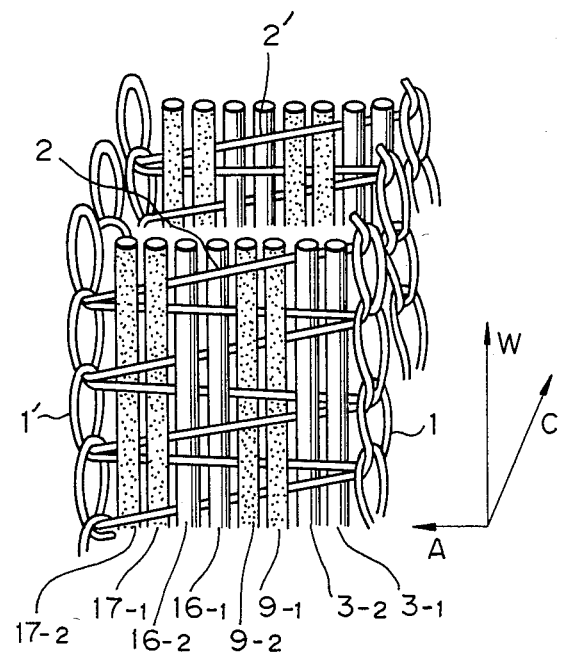
FIG. 9 is an enlarged fragmentary perspective view of a spatial warp knitted structure of the simulated woven type embodying the present invention.

FIG. 9 is an enlarged fragmentary perspective view of a spatial warp knitted structure of the simulated woven type in a preferred embodiment according to the present invention. Referring to FIG. 9, loops 1 and 1' construct front and back warp knitted fabrics, respectively. The corresponding loops 1 and 1' are interconnected with uniting threads 2 and 2' to unite the front and back warp knitted fabrics. Pairs of insert warp threads 3-1 and 3-2, 9-1 and 9-2, 16-1 and 16-2, and 17-1 and 17-2 extend substantially in parallel to the front and back warp knitted fabrics in a vertical direction, namely, along the wale indicated by arrow W. Each pair of the insert warp threads passes alternately on one side and on the other side of a vertical row of the uniting threads to construct a woven structure of plain weave.

Figure 10:
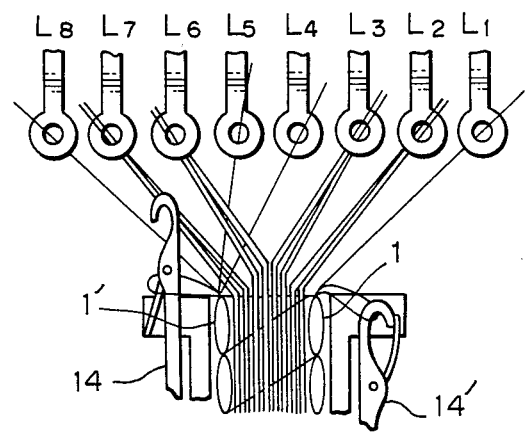
FIG. 10 is schematic illustration of the knitting sections of a double needle bar warp knitting machine.

Referring to FIG. 10 showing a double needle bar warp knitting machine for knitting the spatial warp knitted structure of the simulated woven type of FIG. 9, guide bars $L_1$ and $L_8$ guide threads to needles 14 and 14' to form the loops 1 and 1', respectively. Guide bars $L_4$ and $L_5$ guide threads alternately to the needles 14 and to the needles 14' to form uniting parts of the uniting threads 2 and 2' (FIG. 9) and also the loops 1 and 4'. Guide bars $L_2$, $L_3$, $L_6$ and $L_7$ guide insert warp threads, respectively.

Figure 11:
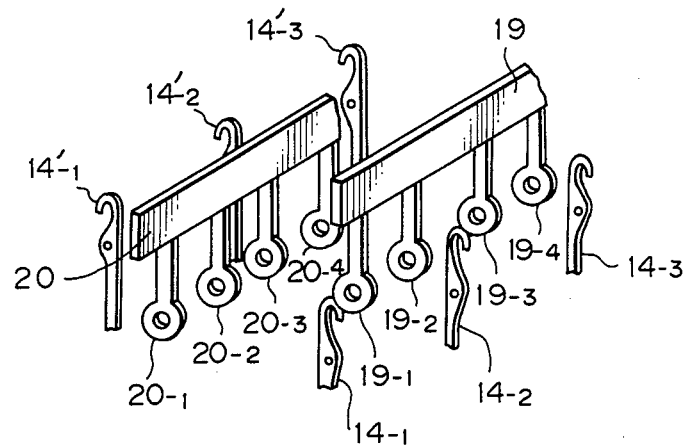
FIG. 11 is a perspective view showing the disposition of needles and guides of warp knitting machine.

In this specification, the two folding portions of a single uniting thread as stitched are regarded a single uniting thread. The vertical rows of the uniting threads are formed at regular intervals along the course in a density of N rows per unit length. The guide bars $L_2$, $L_3$, $L_6$, and $L_7$ are moved sideways alternately in opposite directions for every insertion of the uniting threads by a distance of 1/N of a unit length to stagger the insert warp threads with respect to the vertical row of the uniting threads so that the insert warp threads and the uniting threads as stitched are interlaced in a plain weave construction. The manner of interlacement of the uniting threads and the insert warp threads will be described more concretely hereinafter. As shown in FIG. 11, a guide bar 19 includes two guide elements 19-1, 19-2 between two points corresponding to the needles 14-1, 14-2 and a guide bar 20 includes two guide elements 20-1, 20-2 between two points corresponding to the needle 14-1, 14-2. While first course is stitched, the guide bar 19 corresponding to the guide bar $L_2$ in FIG. 10 makes swing-in motion across a needle row 14, then makes swing-out motion across the same needle row 14 to return to the initial position, then the guide bar 19 makes swing-in motion across a needle row 14', and then the guide bar 19 makes swing-out motion across the same needle row 14' to return to the initial position. While the next course is stitched and the uniting threads engage the needle rows 14 and 14' to form uniting parts, the guide bar 19 is moved sideways first in one direction and then in the other direction by a distance corresponding to the pitch of the needles 14 and 14'. With repetition of this cycle, the insert warp threads and the uniting threads as stitched are interlaced in plain weave. A woven structure can be formed by moving another guide bar 20 corresponding to the guide bar $L_7$ in FIG. 10 sideways always in directions opposite to those of movement of the guide bar 19.

A spatial warp knitted band structure in a preferred embodiment according to the present invention will be described hereinafter with reference to FIGS. 12 to 17.

Figure 12:
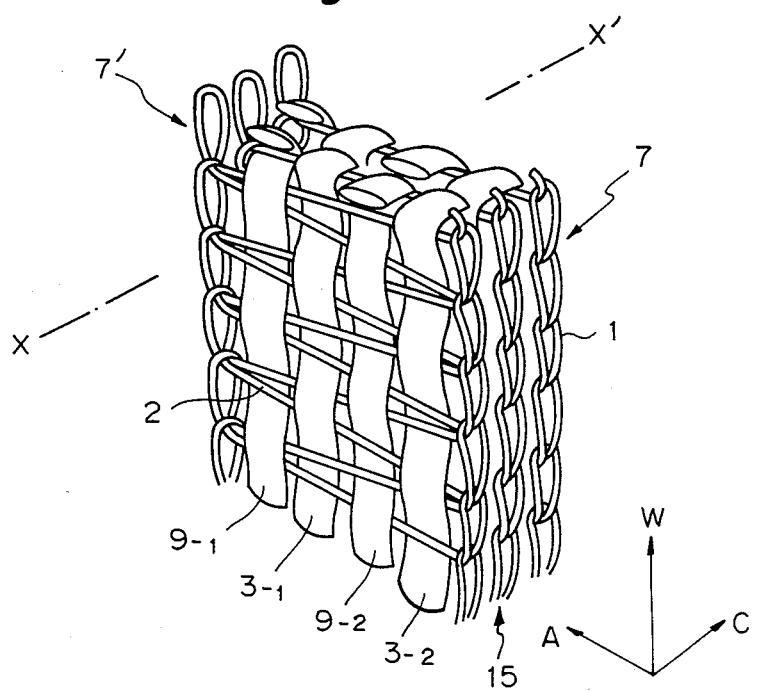
FIG. 12 is a fragmentary perspective view showing a typical spatial warp knitted band structure in a preferred embodiment according to the present invention.

Referring to FIG. 12, a spatial warp knitted band structure has opposite warp knitted fabrics forming the opposite side faces thereof. Each warp knitted fabric consists of three wales 15 of loops 1. The loops of one warp knitted fabric and the corresponding loops of the other warp knitted fabric are interconnected with uniting threads 2, respectively. Four insert warp threads 3-2, 9-2, 3-1, and 9-1 intersect each uniting thread 2 alternately on one side and on the other side of the uniting thread 2 in plain weave.

Figure 13:
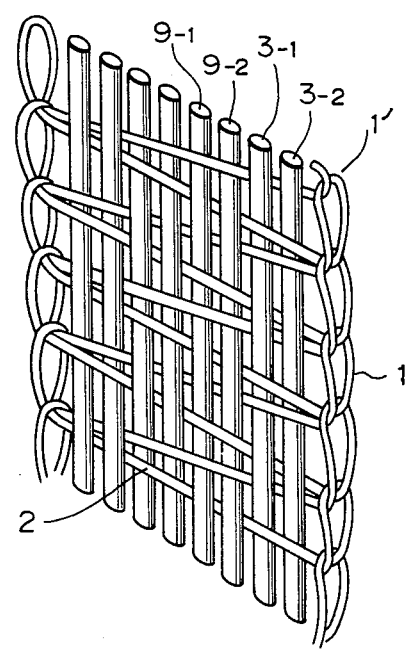
FIG. 13 is a fragmentary perspective view showing a typical warp knitted band structure in another embodiment according to the present invention.

FIG. 13 illustrates one wale section of a spatial warp knitted band structure according to the present invention. The insert warp threads 3-1 and 3-2 and the insert warp threads 9-1 and 9-2 are inserted in pairs so as to stagger with respect to the uniting threads 2 every two uniting threads 2. The pairs of the insert warp threads 3-1 and 3-2 and the insert warp threads 9-1 and 9-2 are always on opposite sides of the uniting threads 2, respectively. The number of the insert warp threads is not less than two. When two insert warp threads are inserted, these two insert warp threads must be inserted alternately with each other with respect to the uniting threads, which forms a woven structure and enhances the concentration of threads with respect to the thickness (thickness along line X-X' in FIG. 12) of the woven structure. Insertion of a plurality of insert warp threads in a regularly staggered configuration relative to the uniting threads with the adjacent insert warp threads alternating with respect to the uniting threads forms a more compact woven structure and enhances the concentration of the threads with respect to the thickness of the woven structure, which enhances the shearing strength of the woven structure.

Figure 14:
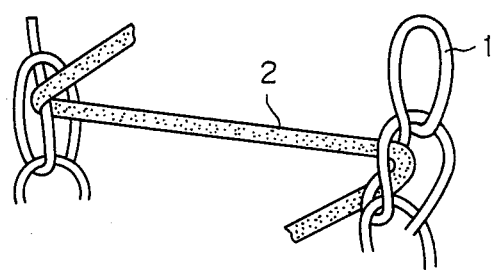
FIG. 14 is an illustration of assistance in explaining the interlacement of a uniting thread and the stitches of wales.

The uniting thread 2 may be used both for forming the loops of the opposite, corresponding wales and for uniting those opposite, corresponding wales as illustrated in FIG. 13, or the uniting thread 2 may be a separate thread only for uniting the opposite, corresponding wales as illustrated in FIG. 14.

Figure 15:
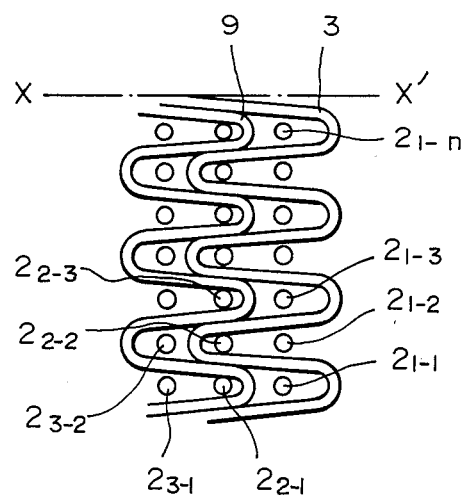
FIGS. 15 to 17 are diagrammatic illustrations of assistance in explaining various modes of intersection of insert threads and uniting threads extending along the course to interconnect the wales.
Figure 16:
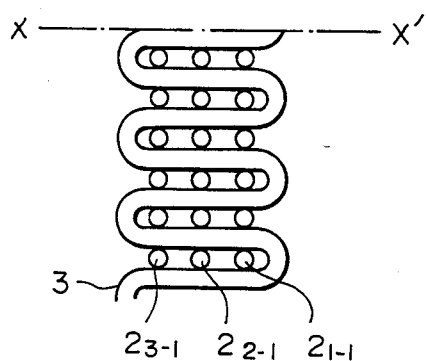
Figure 17:
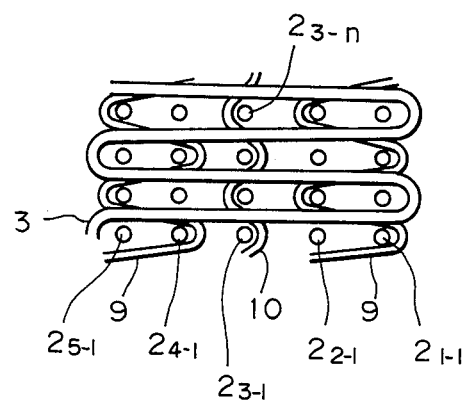

FIGS. 15, 16, and 17 illustrate examples of the relative disposition of the uniting threads and the insert warp threads. In the example of FIG. 15, the corresponding loops of the opposite warp knitted fabrics each consisting of three wales of loops are interconnected with uniting threads $2_{i\text{-}j}$ (i=1 to 3, j=1 to n). In a first course, the insert warp thread 3 passes the right-hand side of the uniting threads $2_{2\text{-}1}$ and $2_{1\text{-}1}$ bonding the loops of the adjacent two wales and, in a second course the insert warp thread 3 passes the left-hand side of the uniting threads $2_{2\text{-}2}$ and $2_{1\text{-}2}$ bonding the loops of the adjacent wales. The insert warp thread 9 passes the right-hand side of the uniting threads $2_{3\text{-}1}$ and $2_{2\text{-}1}$ and the left-hand side of the uniting threads $2_{3\text{-}2}$ and $2_{2\text{-}2}$. In this example, the uniting threads $2_{2\text{-}1}$ to $2_{2\text{-}j}$ intersect both the insert warp threads 3 and 9. Consequently, the threads are concentrated with respect to the thickness (X-X' direction) of the woven structure, and thereby the rigidity of the woven structure is enhanced.

In the example of FIG. 16, the insert warp thread 3 passes alternately on the right-hand side and the left-hand side of three uniting threads $2_{1\text{-}j}$, $2_{2\text{-}j}$ and $2_{3\text{-}j}$ (j=i to n) in the successive courses.

In the example of FIG. 17, the insert warp threads 3, 9 and 10 intersect uniting threads $2_{1\text{-}j}$, $2_{2\text{-}j}$, $2_{3\text{-}j}$, $2_{4\text{-}j}$ and $2_{5\text{-}j}$ (j=1 to n) in the successive courses in different ways, respectively. The insert warp threads 3, 9 and 10 pass alternate on one side and on the other side of the uniting threads $2_{1\text{-}j}$ to $2_{5\text{-}j}$, the uniting threads $2_{1\text{-}j}$ and $2_{2\text{-}j}$ ($2_{4\text{-}j}$ and $2_{5\text{-}j}$), and the uniting threads $2_{3\text{-}j}$, respectively, in the successive courses. However, the mode of intersection of the uniting threads and the insert warp threads are not limited to those shown in FIGS. 15, 16, and 17, but may be any other mode appropriate to the purpose of the relevant spatial warp knitted band structure. Generally, the more complicated the mode of intersection, the higher the rigidity of the structure, and the higher the number of the insert warp threads, the higher the shearing strength of the structure.

The number of wales of the spatial warp knitted band structure is dependent on the desired thickness (length along the course) of the spatial warp knitted band structure. The spatial warp knitted band structure is knitted on a double needle bar warp knitting machine. Threads for forming the wales 15 are guided by two individual guide bars to the two opposite rows of needles. The guide bars for guiding the uniting threads work only for underlapping motion and swing motion. Each insert warp thread needs to intersect at least two uniting threads spaced apart from each other in the direction of the course, which can be achieved by moving the guide bar for the same insert warp thread sideways for underlapping motion by a distance corresponding to two needle pitches or above.

Special section spatial warp knitted structures having partly unconnected adjacent wales and/or courses will be described hereinafter. The special section spatial warp knitted structures have an I-shaped section, a Y-shaped section, and a T-shaped section, respectively. A typical special section spatial warp knitted structures according to the present invention will be described with reference to FIGS. 18, 19, and 20.

Figure 18:
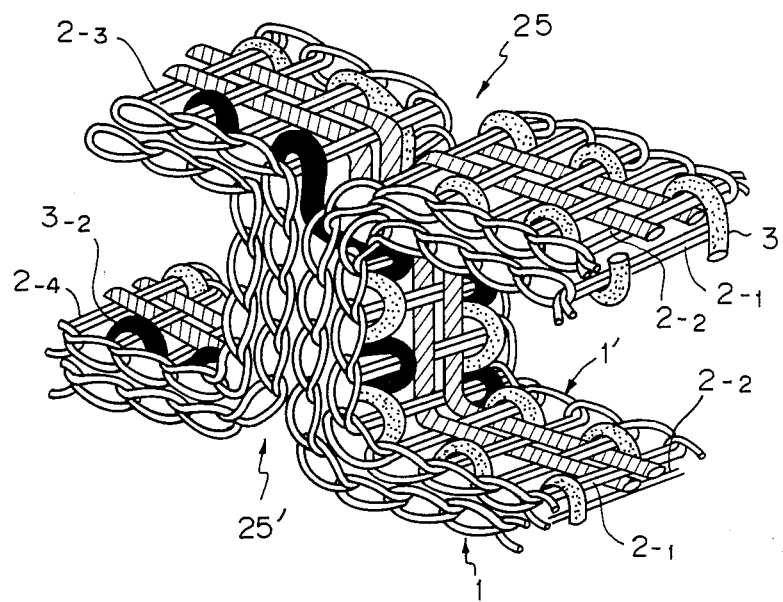
FIG. 18 is a fragmentary perspective view of an embodiment of a spatial warp knitted structure having an I-shaped section, according to the present invention.
Figure 19:
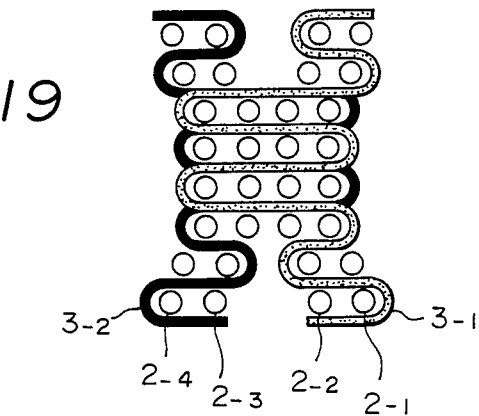
FIG. 19 is an illustration of the interlacement of uniting threads and insert threads in the spatial warp knitted structure illustrated in FIG. 18.

A special section spatial warp knitted structure shown in FIG. 18 has an I-shaped section. This structure is a modification of the spatial warp knitted band structure shown in FIG. 12. This structure has two unconnected parts across the thickness. As illustrated in FIG. 19, two adjacent insert warp threads 3-1 and 3-2 are interlaced with the uniting threads so that some adjacent uniting threads, for example, the uniting threads 2-2 and 2-3 in FIG. 19, are interlaced only with one of the adjacent insert warp threads, for example, the insert warp threads 3-1 and 3-2 in FIG. 19. After thus, knitting a spatial warp knitted band structure having unconnected parts in the upper and lower portion thereof, the unconnected parts 25, 25' are opened horizontally to form a special section spatial warp knitted structure having an I-shaped section as illustrated in FIG. 18. When only one unconnected part 25 is formed in the upper portion of a spatial warp knitted band structure and the unconnected part is opened horizontally, a special section spatial warp knitted structure having a T-shaped section is obtained.

Figure 20A:
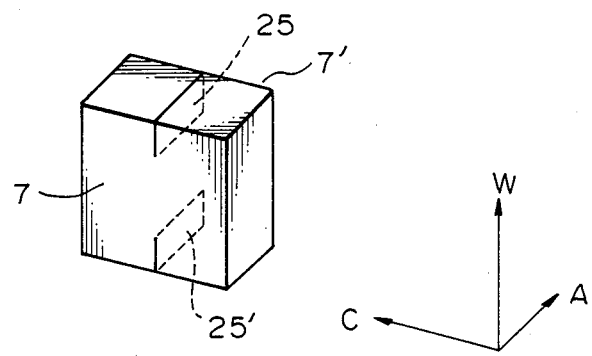
FIG. 20A is a perspective view of various models of spatial warp knitted structure having an I-shaped section according to the present invention.
Figure 20A:
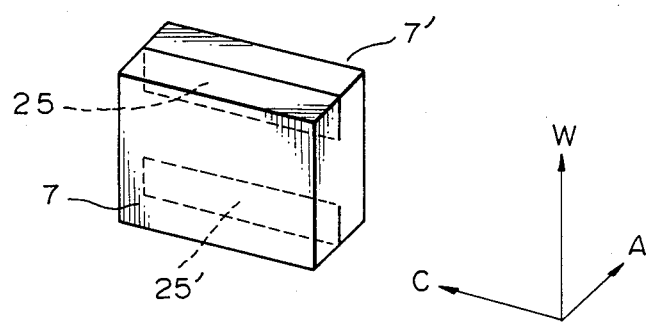
Figure 20A:
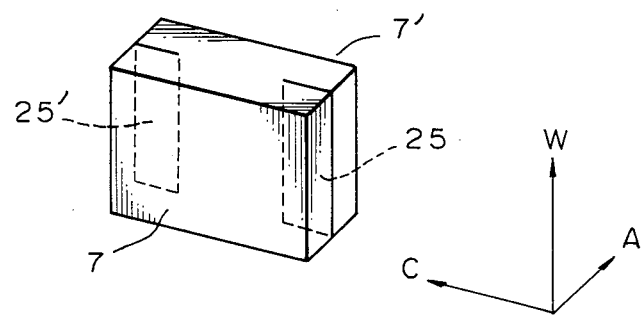
Figure 20B:
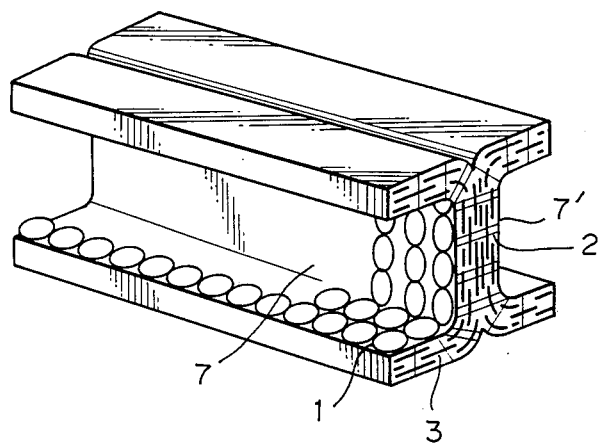
FIG. 20B is a fragmentary perspective view of another embodiment of spatial warp knitted structure having an I-shaped section, according to the present invention.

As shown in FIG. 20A, there are three ways of arranging the unconnected parts 25, 25' in the spatial warp knitted structure. When the unconnected parts 25, 25' are arranged along a direction of thickness of the spatial warp knitted structure in the upper and lower portion thereof as shown in FIG. 20(a), the special section spatial warp-knitted structure having the I-shaped section as shown in FIG. 18 is obtained. When the unconnected parts 25, 25' are arranged along the course in a plane parallel to the front warp knitted fabric 7 and the back warp knitted fabric 7' as shown in FIG. 20A(b), another special section spatial warp knitted structure having the I-shaped section, which is shown in FIG. 20B and is describe in detail hereinafter is obtained. Further the other special section spatial warp knitted structure having the I-shaped section can be obtained by arranging unconnected parts 25, 25' along the wale in a plane parallel to the front warp knitted fabric 7 and the back warp knitted fabric 7' as shown in FIG. 20A(c).

FIG. 20B illustrates in detail a special section spatial warp knitted structure having an I-shaped cross section shown in FIG. 20A(b). This structure is a modification the basic spatial warp knitted structure shown in FIGS. 3 and 4. In knitting the basic spatial warp knitted structure, two guide bars guides uniting threads alternately to the two rows of needles to unite the front and back warp knitted fabrics 7 and 7' through the entire length of the structure. On the other hand, in knitting the special section spatial warp knitted structure having an I-shaped cross section, one of the guide bars guides the uniting threads only to one of the rows of needles while the other guide bar guides the uniting threads only to the other rows of needles, in knitting some courses in the upper and lower portions of the structure. Consequently, unconnected parts extending between and in parallel to the front and back warp knitted fabrics are formed in the upper and lower portions of the structure. After completing the spatial warp knitted structure having two unconnected parts, the unconnected parts are opened horizontally to obtain a special section spatial warp knitted structure having an I-shaped cross-section as illustrated in FIG. 20B. When such an unconnected part is formed only in either the upper or lower portion of the spatial warp knitted structure, a special section spatial warp knitted structure having a T-shaped cross section is obtained.

Spatial warp knitted honeycomb structures according to the present invention will be described hereinafter with reference to FIGS. 21 to 23.

Figure 21:
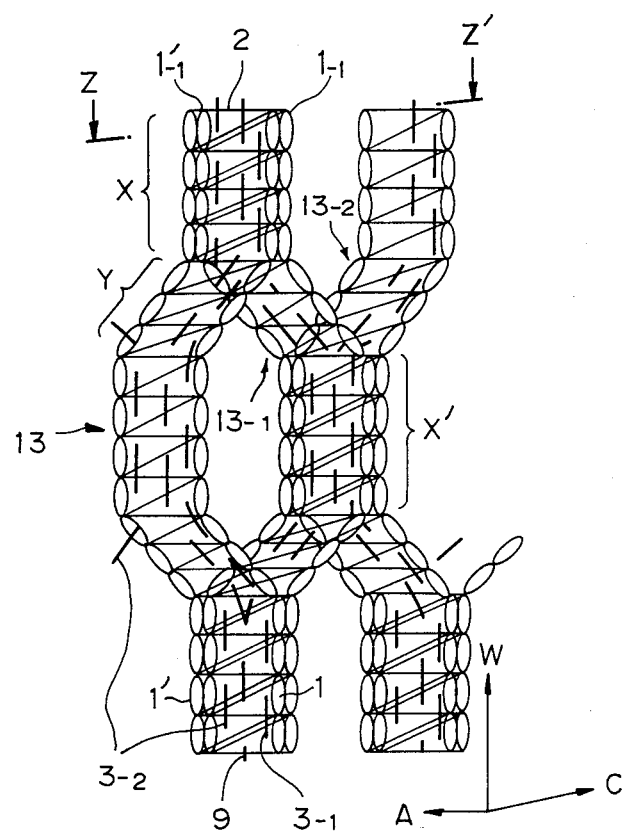
FIG. 21 is a diagrammatic illustration of a spatial warp knitted honeycomb structure in a preferred embodiment according to the present invention.
Figure 22:
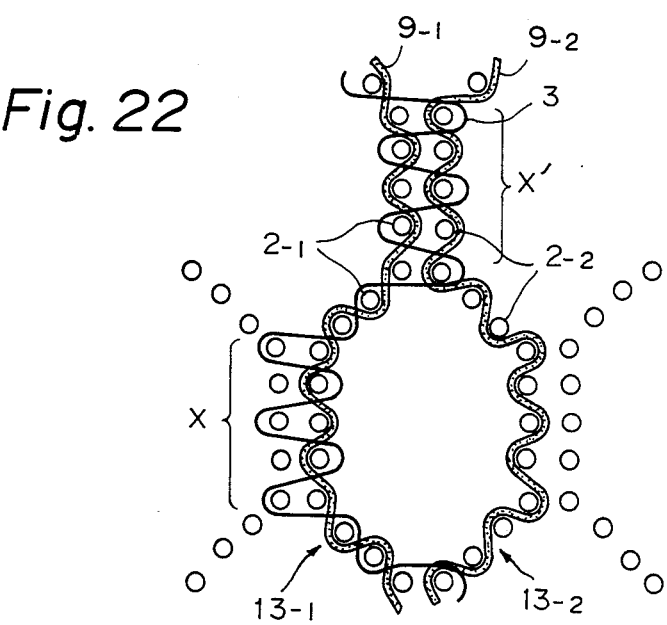
FIG. 22 is a sectional view showing the sectional shape of the spatial warp knitted honeycomb structure of FIG. 21 as line Z-Z' in FIG. 21 is moved in the direction of the arrow.

Referring to FIG. 21, a spatial warp knitted honeycomb structure is formed by partly and regularly separating the adjacent wales. In a section X, insert warp threads 3-1 and 3-2 are interlaced with the same uniting threads bonding the adjacent wales and, in a section X', the insert warp threads 3-1 and 3-2 are interlaced with different uniting threads, respectively. FIG. 22 is a section of the spatial warp knitted honeycomb structure of FIG. 21 in a plane parallel to the front and back warp knitted constructions. Referring to FIG. 22, insert warp threads 9-1 and 9-2 pass alternately on one side and on the other side of the uniting threads 2-1 and 2-2 of band structures 13-1 and 13-2, respectively. An insert warp thread 3 is interlaced at intervals with both the uniting threads 2-1 and 2-2 of the band structures 13-1 and 13-2 so that the adjacent band structures 13-1 and 13-2 are bonded together and separated from each other at intervals. The mode of interlacement of the insert warp thread 3 with the uniting threads 2-1 and 2-2 is optional. Thus, a honeycomb structure is formed by properly distributing the bonded sections and the separated sections each having an appropriate length. Increase in the number of the insert warp threads and/or increase in the density of interlacement of the insert warp threads and the uniting threads enhances the dimensional stability of the honeycomb structure.

Figure 23:
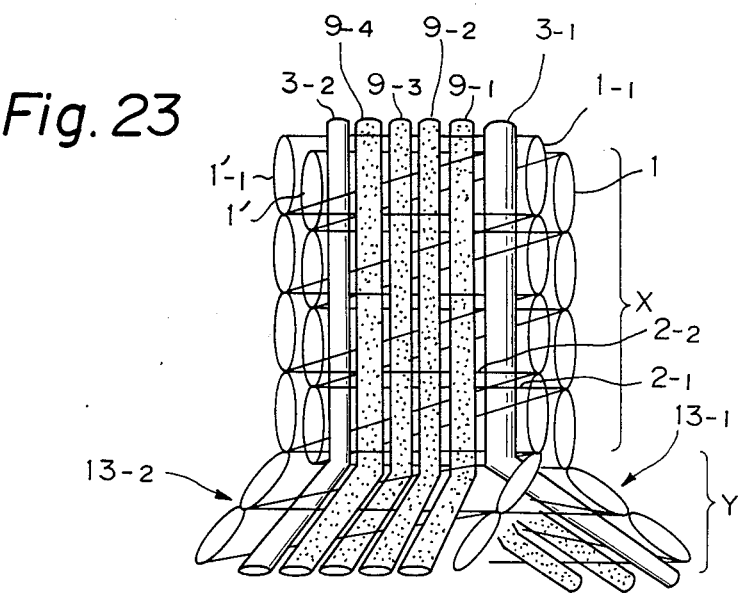
FIG. 23 is an illustration typically showing a spatial warp knitted honeycomb structure in another embodiment according to the present invention.

In a spatial warp knitted honeycomb structure shown in FIG. 23, six insert warp threads 9-1 to 9-4, 3-1 and 3-2 are provided in each unit section. The four insert warp threads 9-1 to 9-4 are interlaced with the uniting thread 2-2 to form a compact woven structure. The insert warp threads 3-1 and 3-2 are interlaced with both the uniting threads 2-1 and 2-2 in the bonded section X to bond the two adjacent band structures 13-1 and 13-2. The insert warp threads 3-1 is interlaced only with the uniting thread 2-1 of the band structure 13-1 while the insert warp thread 3-2 is interlaced only with the uniting thread 2-2 of the band structure 13-2 in the separated section Y. The number of the insert warp threads bonding the adjacent band structure need not necessarily be two, but may be one.

The spatial warp knitted honeycomb structure can be formed in various shapes by varying the lengths of the bonded sections X and the separated sections Y. When the bonded sections X and the separated sections Y are the same in length, a honeycomb structure having regular hexagonal prismatic openings is formed. When each bonded section X is formed with loops of one course, a simulated honeycomb structure having rhombic prismatic opening is formed. The size of the component polygonal openings is dependant on the lengths of the bonded sections X and the separated sections Y, the lengths corresponding to the number of loops along the wale.

The thickness of the band structures constructing the honeycomb structure is dependent on the number of wales in the bonded sections X. Increase in the thickness of the band structure increases the compressive strength of the spatial warp knitted honeycomb structure, while thin band structure form a lightweight spatial warp knitted honeycomb structure.

A method of constructing the spatial warp knitted honeycomb structure will be described hereinafter with reference to FIGS. 24 and 25.

Figure 24:
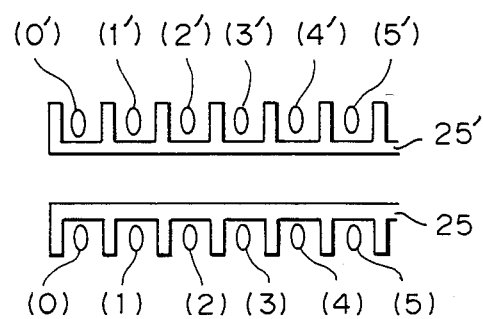
FIG. 24 is a schematic plan view of the knitting section of a double needle bar warp knitting machine.

FIG. 24 illustrates the two needle bars of a double needle bar warp knitting machine in plan view. Uniting threads are guided to front needles 1, 2 and 3 and back needles 1', 2' and 3' to stitch loops and to interconnect the front loops and the back loops. At least one guide bar is shogged by a distance corresponding to one needle pitch to insert warp threads between the uniting threads in a staggered arrangement with respect to the uniting threads. Furthermore, at least two guide bars insert warp threads between the uniting threads in a one-in-one-out arrangement. For example, in FIG. 21, the insert warp thread 3-1 is staggered between the uniting threads stitched by the needles 1, 1', 3 and 3' across a fixed number of courses by shogging the corresponding guide bar by one needle pitch, and then the insert warp thread 3-1 is staggered between the uniting threads stitched by the needles 0, 0' 2 and 2' across the same number of courses by shogging the guide bar by two needle pitches. Furthermore, the insert warp thread 3-1 is staggered in the initial state by shogging the guide bar by one needle pitch, and then the insert warp thread 3-1 is staggered between the uniting threads stitched by the needles 2, 2', 4 and 4' across the same number of courses. The insert warp thread 3-2 is staggered between the uniting threads stitched by the needles 2, 2', 4, and 4'. The insert warp threads 3-2 and 9 are staggered opposite to each other. Thus, a spatial warp knitted honeycomb structure is formed.

Figure 25:
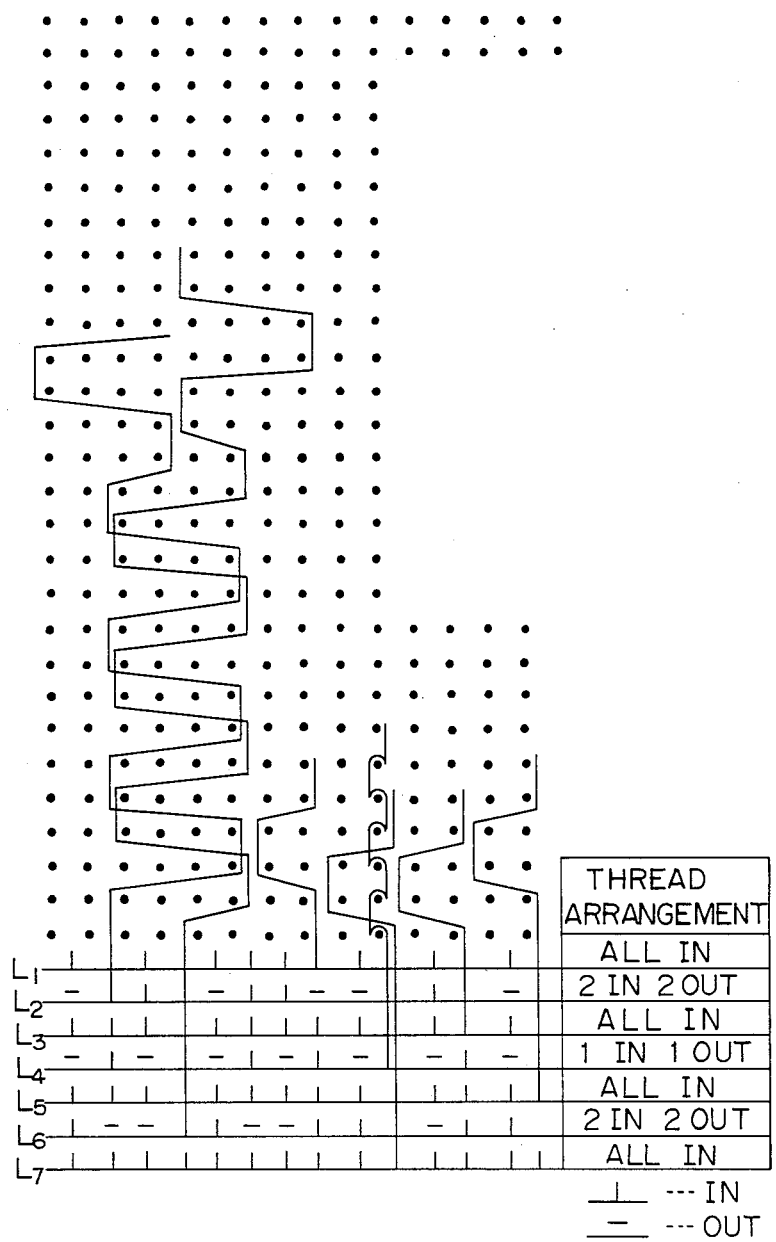
FIG. 25 shows a notation of a spatial warp knitted honeycomb structure embodying the present invention.
Figure 26:
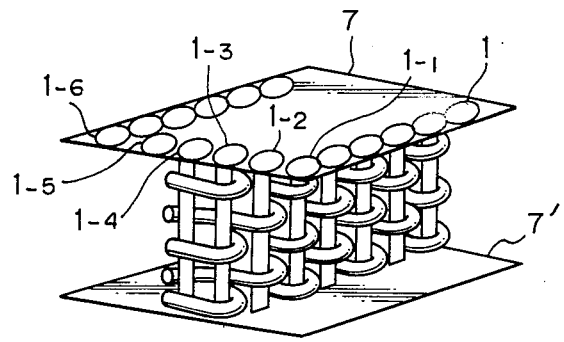
FIG. 26 is a fragmentary perspective view of a spatial warp knitted bar structure having an I-shaped section, according to the present invention.

FIG. 25 is a notation of a spatial warp knitted honeycomb structure knitted on a double needle bar warp knitting machine equipped with seven guide bars.

Figure 27:
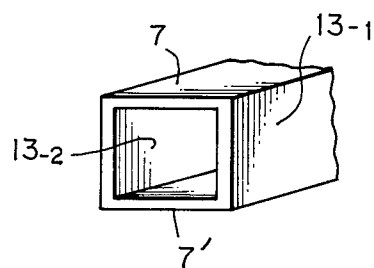
FIG. 27 is a fragmentary, perspective view of a typical spatial warp knitted bar structure having a square section according to the present invention.
Figure 28:
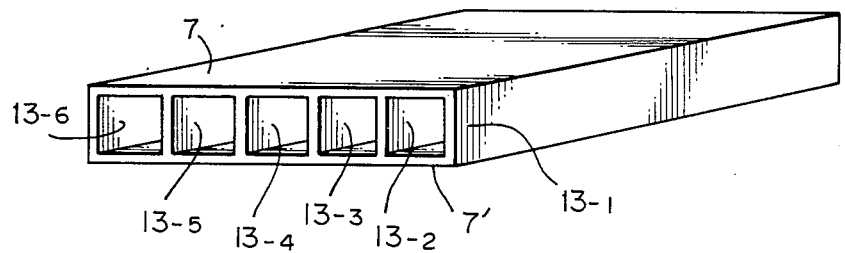
FIG. 28 is a perspective view of a typical spatial warp knitted board structure according to the present invention.

A spatial warp knitted board structure according to the present invention will be described hereinafter with reference to FIGS. 27 and 28. The spatial warp knitted board structure is embodied in a board structure consisting of a front and back warp knitted fabrics 7 and 7' and two band structures 13-1 and 13-2, and having a hollow rectangular section as illustrated in FIG. 27, or in a board structure consisting of front and back warp knitted fabrics 7 and 7' and a plurality of band structures, for example, six band structures 13-1 to 13-6, and having a hollow segmental, rectangular section as illustrated in FIG. 28. The spatial warp knitted board structure having a hollow rectangular section is formed by uniting the front and back warp knitted fabrics 7 and 7' by two band structures 13-1 and 13-2 each consisting of uniting threads and insert warp threads interlaced with the uniting threads. The spatial warp knitted board structure having a hollow, segmental rectangular section is formed by uniting the front and back warp knitted fabrics 7 and 7' by a plurality of band structures extending along the wales and distributed at regular intervals along the course. These spatial warp knitted board structures can easily be knitted by properly threading the guide bars.

A spatial warp knitted sandwiched honeycomb structure according to the present invention will be described with reference to FIGS. 29 and 30. Tis spatial warp knitted sandwiched honeycomb structure is a modification of the spatial warp knitted honeycomb structure.

Figure 29:
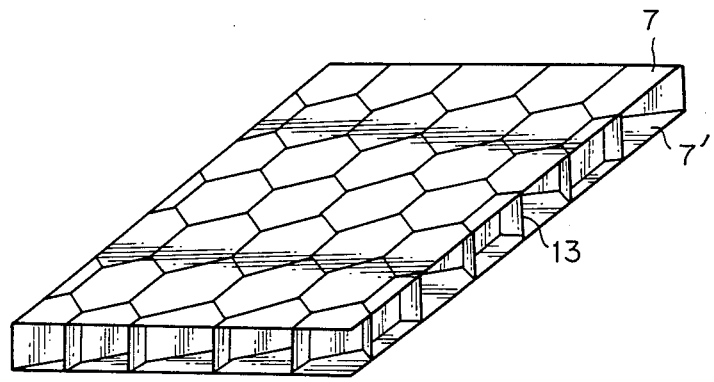
FIG. 29 is a perspective view showing a typical honeycomb board according to the present invention.
Figure 30:
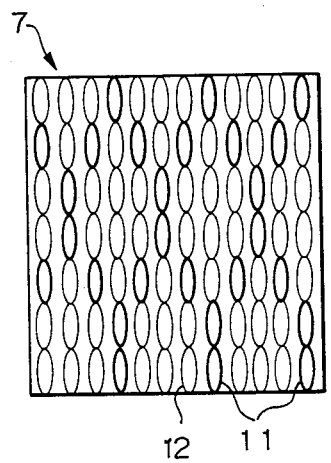
FIG. 30 is a plan view of the typical honeycomb board of FIG. 29.

In FIG. 29, indicated at 13 is the foregoing band structure comprising the loops 1 and 1', the uniting threads 2, and the insert warp threads 3 and 9. In FIG. 30, portions 11 of wales indicated by thick lines in front and back warp knitted fabrics (only the front warp knitted fabric is shown in FIG. 30) are formed by the loops 12 of the front and back warp knitted fabrics and the loops 1 and 1' of the spatial warp knitted honeycomb structure shown in FIG. 21. Accordingly, all or some of the corresponding loops of the portions 11 of wales in the front and back warp knitted fabrics and united by the uniting threads, respectively, whereas the corresponding loops 12 in the front and back warp knitted fabrics are separated from each other. Thus, the spatial warp knitted honeycomb structure and the front and back warp knitted fabrics are combined through warp knitting to form a spatial warp knitted sandwiched honeycomb structure without requiring any particular bonding means. The reinforcement of the front and back warp knitted fabrics with insert warp threads and/or inlaid threads increases the strength of the spatial warp knitted sandwiched honeycomb structure.

The spatial warp knitted sandwiched honeycomb structure is knitted on a double needle bar warp knitting machine equipped with 12 guide bars. The guide bars are threaded properly according to the shape and size of the spatial warp knitted honeycomb structure uniting the front and back warp knitted fabrics.

A spatial warp knitted skeleton structure according to the present invention will be described hereinafter with reference to FIG. 31.

Figure 31:
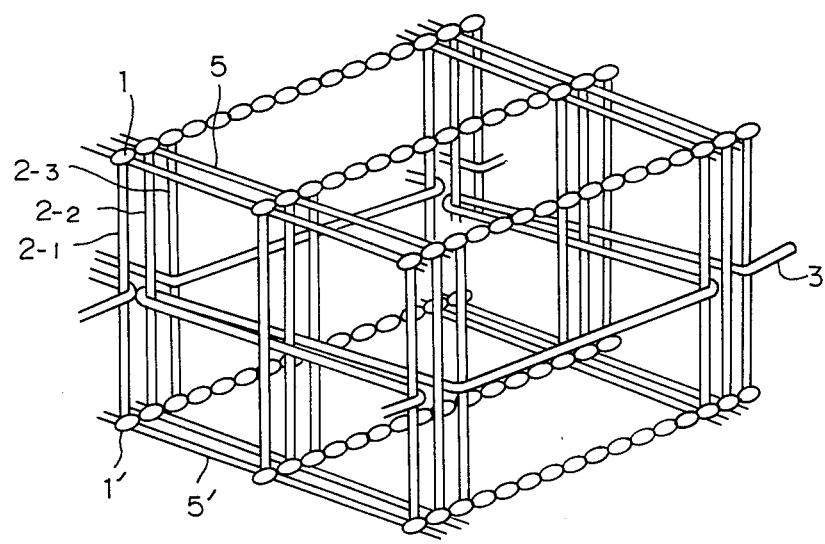
FIG. 31 is a fragmentary perspective view of a spatial warp knitted skeleton structure embodying the present invention.

In FIG. 31, indicated at 1 and 1" are loops stitched in pillar stitch in the front and back warp knitted fabrics, respectively, at 2 are uniting threads, at 3 are insert warp threads inserted between the front and back warp knitted fabrics along the wale and also along the course, and at 5, 5' are inlaid threads bonding the adjacent wales of pillar stitches.

The wales of pillar stitches are arranged at regular intervals in the direction of course. The wales of pillar stitches of the front warp knitted fabric and the corresponding wales of pillar stitches of the back warp knitted fabric are united partly by uniting threads 2-1, 2-2, and 2-3. The insert warp threads 3 are inserted both in the direction of the course and in the direction of the wale so as to be interlaced with or intersected by the intermediate portions of the uniting threads 2 extending between the front and back warp knitted fabrics. Naturally, the number of the uniting threads is optional and is dependent on the purpose of the spatial warp knitted skeleton structure. However, the number of the uniting threads for each uniting part must be not less than two, and is preferably three or above, for firmly holding the insert warp threads 3 in place. Separate insert warp threads may be inserted individually in the direction of the wale and in the direction of the course (lay-in), respectively. Thus, the skeleton structure is formed by the wales of pillar stitches 1 and 1', the uniting threads 2 extending between the respective wales of pillar stitches of the front and back warp knitted fabrics, and the insert warp threads 3 interconnecting the uniting threads 2. Interconnection of the adjacent wales of pillar stretches at the intermediate loops thereof by additional inlaid threads reinforces the spatial warp knitted skeleton structure effectively. It is obvious that the spatial warp knitted skeleton structure can be formed in various constitutions.

A method of manufacturing the spatial warp knitted skeleton structure will be described hereinafter with reference to FIG. 32.

All the guide bars $L_1$ to $L_7$ are partially threaded one-in-four-out. The guide bars $L_2$ and $L_6$ guide threads for forming the loops of the front and back warp knitted fabrics (in this case, pillars of chain stitches). The guide bars $L_1$ and $L_7$ guide threads to be laid in between the wales of pillar stitches. The guide bars $L_1$ and $L_7$ guide the threads 5 and 5' for interconnecting the adjacent pillars or pillar stitches. The threads guided by the guide bars $L_1$ and $L_7$ are laid-in into the pillar of pillar stitches in knitting a first to fifth courses and are laid-in into another pillar of pillar stitches after a sixth course by reducing the distance of shogging motion. The distance of shogging motion of the guide bars $L_1$ and $L_7$ is increased and reduced periodically to interconnect the pillars of chain stitches. The guide bars $L_3$ and $L_5$ guide the insert warp threads. The guide bar $L_3$ guides insert warp threads to stagger the same with respect to the uniting threads between a first course and a third course. The distance of shogging motion of the guide bar $L_3$ is increased in a fourth course to form one side of the cuboidal skeleton structure, and then the guide bar $L_3$ is shogged by one needle pitch in a fourth and fifth courses to stagger the insert warp threads with respect to the uniting threads. Then, the guide bar $L_3$ remains idle to insert the insert warp threads along the wale. Naturally, the spatial warp knitted skeleton structure may be formed in various forms by varying the number of guide bars, the mode of threading, and the type of stitches.

The strengths along the wales and the courses of the conventional spatial warp knitted structure are dependent on the characteristics of the component warp knitted fabrics, and hence the strengths along the wales and the courses are far less than the strength along the thickness. Since the basic spatial warp knitted structure of the present invention incorporates insert warp threads and/or insert weft threads between the front and back warp knitted fabrics, the basic spatial warp knitted structure has three-dimensionally well balanced high strength. When necessary, the strength along only one direction can be increased. Since the basic spatial warp knitted structure is formed entirely through warp knitting and is provided with uniting threads extending across the thickness thereof, the front and back warp knitted fabrics are never separated from each other.

The spatial warp knitted structure of the simulated woven type comprises front and back warps knitted fabrics united by uniting parts formed by properly interlacing the insert warp threads with the uniting threads in a woven construction. Accordingly, the spatial warp knitted structure of the simulated woven type has a very high compressive strength and is capable of permanently maintaining the spatial morphology. Furthermore, the uniting parts each formed by interlacing the insert warp threads with the uniting threads in a woven construction maintain the spatial morphology of the spatial warp knitted structure of the simulated woven type even if the front and back warp knitted fabrics of the spatial warp knitted structure are formed in a coarse construction, such as honeycomb construction.

Still further, a woven structure formed by interlacing the insert warp threads with the uniting threads between the front and back warp knitted fabrics increases the thickness and strength of the spatial warp knitted structure of the simulated woven type, and the interlacement of the insert warp threads and the uniting threads constructs compact and rigid uniting parts, which maintains the spatial morphology effectively. According to the method of manufacturing the spatial warp knitted structure of the simulated woven type, a spatial warp knitted structure of the simulated woven type having a high insert warp thread density can be knitted on a double needle bar warp knitting machine equipped with a small number of guide bars.

The spatial warp knitted band structure according to the present invention is formed in a compact spatial structure having uniform strength in all directions and a sufficiently large thickness. This spatial structure is highly resistant to compression particularly in the direction of the thickness (a direction along line X–X' in FIG. 12).

The spatial warp knitted honeycomb structure according to the present invention is knitted on a warp knitting machine without requiring any particular process such as a process for adhesively bonding layers of warp knitted fabrics. Since the front and back honeycomb fabrics are united by woven structures formed by interlacing the insert warp threads with the uniting threads, the spatial warp knitted honeycomb structure has a very high compressive strength and is capable of maintaining the spatial morphology.

The special section spatial warp knitted structures respectively having an I-shaped section, a T-shaped section, a hollow rectangular section, and a hollow segmental rectangular section, according to the present invention each comprises front and back warp knitted fabrics and a simulated woven structure constructed by interlacing the component threads so as to unite the front and back warp knitted fabrics. Therefore, the special section spatial warp knitted structures have satisfactory dimensional stability.

The spatial warp knitted skeleton structure according to the present invention is knitted on a warp knitting machine capable of inserting insert warp and/or weft threads between the front and back warp knitted fabrics. Thus, the insert warp and/or weft threads provide the spatial warp knitted structure with three-dimensionally well balanced strength. The weft threads laid in the front and back warp knitted fabrics across the entire width of the spatial warp knitted structure enhance the rigidity of the spatial warp knitted structure, not to mention the strength along the width.

Since the rear edge of the trick plate and the edges of the guide eyes of the guides employed in the warp knitting machine according to the present invention are rounded, threads which have been difficult to knit, such as carbon filament threads, can be knitted without being damaged on the warp knitting machine of the present invention.

The insert warp threads and the insert weft threads are not those laid in the front and back warp knitted fabrics, but those inserted between the substantially in parallel to the front and back warp knitted fabrics.

The warp knitting machine according to the present invention needs to be equipped with at least four guide bars for guiding insert threads. If the warp knitting machine is equipped with less than four guide bars, it is impossible to form the spatial warp knitted structure in a sufficient thickness and to provide the spatial warp knitted structure with sufficient strength along the wales and courses. The guide bars for inserting insert threads may be moved only for underlapping motion. A warp knitting machine equipped with more guide bars is able to knit a spatial warp knitted structure having a more complex construction, which enhances the rigidity and the tensile strength along the wales and courses of the spatial warp knitted structure. However, since an increased number of guide bars make guide bar arrangement difficult, the preferable maximum number of guide bars is 16 or less. According to the present invention, at least one intermediate guide bar needs to be able to overlap both the front needles and the back needles in order to unite the front and back warp knitted fabrics with uniting threads, which is essential to form a spatial warp knitted fabric of the present invention. The warp knitting machine according to the present invention has at least one guide bar for guiding uniting threads, however, it is preferable to equip the warp knitting machine with two guide bars for guiding uniting threads in order to increase the number of uniting threads extending across the thickness of the spatial warp knitted structure and to limit the total number of the guide bars. The warp knitting machine according to the present invention is equipped with guide bars for guiding threads for constructing the front and back warp knitted fabrics. Preferably, these guide bars are disposed on the front and back sides of the guide bar arrangement, respectively.

The warp knitting machine according to the present invention is equipped with a front weft inserting mechanism capable of inserting weft threads across the entire range of the front needles and a back weft inserting mechanism capable of inserting weft threads across the entire range of the back needles. The front and back weft inserting mechanisms may be any suitable known weft inserting mechanism, preferably, compact weft inserting mechanisms.

Basically, the let-off motion, the patterning mechanism, and the take-up motion of the warp knitting machine according to the present invention are the same as those of the conventional double Raschel machine. 1 Basically, the trick plate, needles, stitch combs, and guide reeds employed in the conventional warp knitting machine are applicable to the warp knitting machine according to the present invention. However, since the warp knitting machine of the present invention is required to knit brittle threads having a high modulus of elasticity, such as glass yarns, carbon filament yarns, and ceramic yarns, at least the edge of the trick plate and the edges of the guide eyes of the guide reeds must rounded in a radium of 0.2 mm or above, preferably, 0.3 mm or above.

A double needle bar warp knitting machine in a preferred embodiment according to the present invention will be described hereinafter with reference to FIGS. 33 to 37.

(1) Let-off Motions

Ten let-off motions $S_1$ to $S_{10}$ for supplying the threads Y wound on 10 groups of sectional warp beams B mounted on beam shafts to the needles 14 and 14' are disposed over the needle bars. The sheets of the parallel threads Y unwound from the sectional warp beams B are guided via tension rods and guide bars $L_1$, $L_2$, ... and $L_n$ to the needles 14 and 14', respectively. The tension rods are caused to swing according to the tension of the threads Y, while the let-off motions $S_1$ to $S_{10}$ regulate the rotation of the corresponding beam shafts according to the swing motion of the tension rods, respectively, so that the threads Y are let off as the knitting operation proceeds. Thus, the let-off motions $S_1$ to $S_{10}$ are capable of regulating the thread feed rate according to the tension of the threads Y.

(2) Guide Bars

Ten guide bars $L_1$ to $L_{10}$ corresponding to the 10 let-off motions $S_1$ to $S_{10}$, respectively, are provided. The guide bars $L_3$, $L_4$, $L_7$, and $L_8$ are used for insertion; the guide bars $L_5$ and $L_6$ are used for guiding uniting threads; and the guide bars $L_1$, $L_2$, $L_9$, and $L_{10}$ are used for guiding warp threads for forming loops. The edges of the guide eyes 28 of the guide reeds are rounded in a radius of 0.4 mm.

(3) Pattern Mechanism

The pattern mechanism controls the 10 guide bars for patterning. The pattern mechanism comprises 10 sets of pattern chains to control the 10 guide bars for individual shogging motion. Basically the pattern mechanism is similar to the conventional pattern mechanism.

(4) Trick Plate

Two trick plates 25 and 25' are disposed in parallel to each other. The rear edge 29 of each trick plate is rounded in a radius $r_2$ of 0.5 mm. The trick plates are provided with vertical teeth in the respective front surfaces. The trick plates are disposed with a gap of 60 mm therebetween.

(5) Needles and Stitch Combs

The needles 14 and 14' are latch needles. The needles and the teeth of the trick plates are arranged alternately. Each needle bar is provided with 480 needles. Front and back stitch combs 26 and 26' are provided for front and back needle bars, respectively. The stitch combs 26 and 26' hold loops for knock-over when the needles 14 and 14' are raised.

(6) Fabric Draw-off Motion

The fabric draw-off motion comprises two rollers covered with card clothing for drawing the spatial warp knitted structure. The rollers are disposed with a gap of 60 mm therebetween so that the spatial warp knitted structure can be drawn without being compressed.

(7) Weft Inserting Device

The weft inserting device is extended in parallel to the needle bars.

The manner of operation of the double needle bar warp knitting machine will be described hereinafter.

The swing motion of the guide bars and the stitching motions of the needles, the trick plates, and the stitch combs are controlled by an eccentric cam secured to the main shaft which is driven by a motor. The pattern mechanism and the fabric draw-off mechanism are interlocked with the main shaft. The eccentric cam is designed for controlling a series of the following knitting operations.

(1) The front needles 14 are raised and the stitch combs 26 are advanced toward the front needles 14.

(2) The guide bars $L_1$ to $L_{10}$ are driven for swing motion, and, upon the passage of the guide reeds of the guide bars $L_1$ to $L_6$ across spaces between the front needles 14, shogging motion is started. The guide bars $L_2$, $L_5$ and $L_6$ are shogged by one needle pitch for overlapping, while the guide bars $L_1$, $L_3$, and $L_4$ are not shogged.

(3) The guide bars are driven for return swing, the needles 14 start down motion, and the stitch combs are retracted.

(4) The back weft inserting mechanism is actuated to insert an insert weft thread behind the back needles 14' with an inserter 27'.

(5) The back needles 14' are raised and the stitch combs 26' are advanced toward the back needles.

(6) The knitting motions (2) and (3) are repeated by the mechanisms for the back needles 14', while the weft inserting motion (4) is repeated by the front weft inserting mechanism.

Thus, a series of the knitting operations are repeated sequentially to form a novel spatial warp knitted structure.

The spatial warp knitted structures according to the present invention are generally used as a composite material made by impregnating the spatial warp knitted structure with resin. Since axes of the threads constituting the spatial warp knitted structures are arranged in various directions in the spatial warp knitted structure, the spatial warp knitted structure impregnated with the rein has high tensile strength and high compressive strength in various directions. Further, the composite material made by using the spatial warp knitted structure according to the present invention has lighter weight than a metal material. Therefore the composite material made by using the spatial warp knitted structure can be used for the structural material of an airplane, vehicle, or the like.

Example 1

Figure 6:
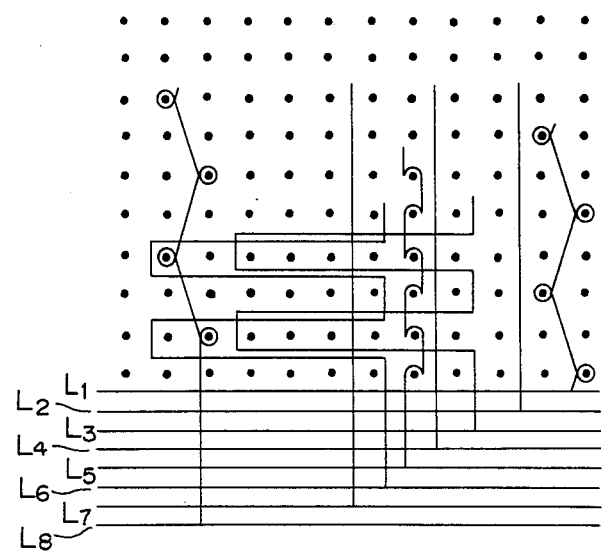
FIG. 6 shows a notation of spatial warp knitted structures embodying the present invention.

A spatial warp knitted structure of a construction represented by a notation shown in FIG. 6 was knitted on a double needle bar Raschel machine shown in FIG. 5.

The double Raschel machine is of 18 gauges (per inch) equipped with eight guide bars $L_1$ to $L_8$. The guide bars $L_1$ and $L_8$, the guide bar $L_5$, the guide bars $L_2$, $L_4$, and $L_7$, and guide bars $L_3$ and $L_6$ were used for forming front and back warp knitted fabrics, for uniting the front and back warp knitted fabrics, for inserting insert warp threads in three rows, and for inserting insert weft threads in two rows, respectively. The guide bars $L_1$, $L_5$, and $L_8$ and the guide bars $L_2$, $L_3$, $L_4$, $L_6$, and $L_7$ were threaded with 200 denier polyaramide filament yarns and 1800 denier carbon filament yarns, respectively. A spatial warp knitted structure thus obtained was 4.0 mm in thickness and comprised two warp knitted fabrics consisting of the 200 denier polyaramide filament yarns and layers of the 1800 denier carbon filament insert warp and weft threads extended along the wales and courses.

Example 2

A spatial warp knitted structure of the simulated woven type as shown in FIG. 7 was knitted on a double needle bar Raschel machine equipped with eight guide bars. The guide bars $L_2$ and $L_3$ ($L_6$ and $L_7$) were controlled only for swing motion and underlapping motion opposite to each other. The guide bars were threaded as tabulated in Table 1 and were moved according to notations tabulated in Table 2.

TABLE 1

| Guide bars | Threading | Yarn type (denier/filaments) |
|---|---|---|
| $L_1$ | Warp threads | Polyester 150/24 |
| $L_2$ | Insert warp threads | Polyester 1000/120 |
| $L_3$ | Insert warp threads | Polyester 1000/120 |
| $L_4$ | Uniting threads | Polyester 300/48 |
| $L_5$ | Uniting threads | Polyester 300/48 |
| $L_6$ | Insert warp threads | Polyester 1000/120 |
| $L_7$ | Insert warp threads | Polyester 1000/120 |
| $L_8$ | Warp threads | Polyester 150/24 |

TABLE 2

| Guide bars | Notations | Guide bars | Notations |
|---|---|---|---|
| $L_1$ | \|20\|22\|24\|22\| | $L_5$ | \|02\|20\| |
| $L_2$ | \|00\|22\|22\|00\| | $L_6$ | \|00\|00\|22\|22\| |
| $L_3$ | \|22\|00\|00\|22\| | $L_7$ | \|22\|22\|00\|00\| |
| $L_4$ | \|20\|02\| | $L_8$ | \|22\|20\|22\|24\| |

A spatial warp knitted structure of the simulated woven type had insert warp threads 3, 3', 3", and 3''' inserted in four rows between the front and back warp knitted fabrics and interlaced with the uniting threads 2 in a woven construction as shown in FIG. 7.

Example 3

A spatial warp knitted structure of the simulated woven type similar to that shown in FIG. 8 was knitted on the same double needle bar Raschel machine employed in Example 1. The guide bars $L_1$, $L_3$, $L_6$, and $L_8$, the guide bars $L_2$, $L_4$, and $L_7$, and the guide bar $L_5$ were threaded with 1800 denier polyaramide filament yarns for insert warp threads, 1800 denier polyaramide filament yarns for insert weft threads, and 200 denier polyaramide filament yarns for warp threads and uniting threads, respectively. The spatial warp knitted structure of the simulated woven type thus obtained had three-dimensionally well balanced strength.

Example 4

Figure 38:
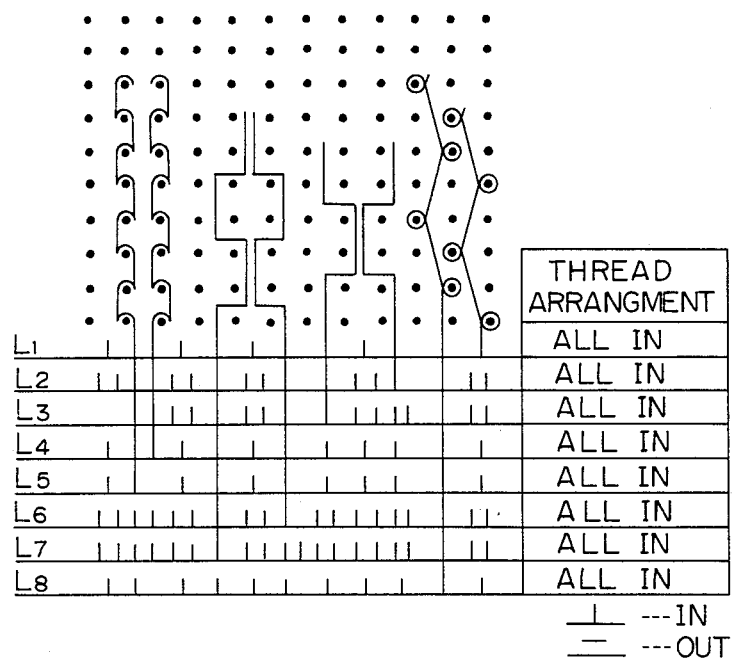
FIG. 38 shows a notation of a spatial warp knitted structure described in Example 4 embodying the present invention.

A spatial warp knitted structure of the simulated woven type having a construction represented by notations shown in FIG. 38 was knitted on a double needle bar Raschel machine of 18 g equipped with eight guide bars $L_1$ to $L_8$. Every other needle was removed (FIG. 11) so that the actual needle gauge is 9 g. The guide bars $L_1$ and $L_8$, the guide bars $L_4$ and $L_5$, and the guide bars $L_2$, $L_3$, $L_6$, and $L_7$ were threaded with 150 denier, 24 filaments polyester filament yarns for warp threads, 200 denier, 40 filaments polyester filament yarns for warp threads and uniting threads, and 1800 denier, 240 filaments polyester filament yarns for insert warp threads, respectively. The guide bars $L_1$, $L_4$, $L_5$, and $L_8$ were of 9 g. The guide bars for inserting the insert warp threads were threaded in full to insert the insert warp threads in a density of 18 threads per inch and were controlled only for swing motion and underlapping motion, the magnitude of the underlapping motion being 1/9 inch or above. The guide bars $L_2$ and $L_3$ and the guide bars $L_6$ and $L_7$ were moved opposite to each other, respectively, to insert four pairs of insert warp threads per one uniting thread so that the pairs of the insert warp threads are interlaced with the uniting threads in a woven construction. The density of the uniting threads along the courses was nine threads per inch. A spatial warp knitted structure of the simulated woven type similar to that shown in FIG. 9 was obtained.

Example 5

A spatial warp knitted band structure was knitted on a double needle bar Raschel machine of 18 g equipped with eight guide bars threaded as shown in Tables 3 and 5 and controlled for lapping motion as shown in Table 4. A spatial warp knitted band structure thus obtained had a form similar to that shown in FIG. 17, a thickness of 4 mm and five loops in one wale.

TABLE 3

| Guide bars | Threading | Yarn type (denier/filaments) |
|---|---|---|
| $L_1$ | Warp threads | Nylon 210/40 |
| $L_2$ | Insert warp threads | Nylon 1200/60 |
| $L_3$ | Insert warp threads | Nylon 1200/60 |
| $L_4$ | Uniting threads | Nylon 840/160 |
| $L_5$ | Insert warp threads | Nylon 1200/60 |
| $L_6$ | Insert warp threads | Nylon 1200/60 |
| $L_7$ | Insert warp threads | Nylon 1200/60 |
| $L_8$ | Warp threads | Nylon 210/40 |

TABLE 4

| Guide bars | Notations | Guide bars | Notations |
|---|---|---|---|
| $L_1$ | \|20\|00\|02\|22\| | $L_5$ | \|22\|22\|00\|00\| |
| $L_2$ | \|1010\|1010\|00\|00\| | $L_6$ | \|44\|44\|00\|00\| |
| $L_3$ | \|00\|00\|44\|44\| | $L_7$ | \|00\|00\|1010\|1010 |
| $L_4$ | \|20\|02\| | $L_8$ | \|22\|20\|00\|02\| |

TABLE 5

| Guide bars | Threading |
|---|---|
| $L_1$ | x x \| \| \| \| x |
| $L_2$ | x x \| x x x x x |
| $L_3$ | x x x x \| x x \| |
| $L_4$ | x x \| \| \| \| x |
| $L_5$ | x x \| \| \| \| x |

TABLE 5-continued

| Guide bars | Threading |
|---|---|
| $L_6$ | x x \| x x \| x x |
| $L_7$ | x x x x x x x \| |
| $L_8$ | x x \| \| \| \| \| x |

Note: x: Out, |: In

Example 6

A spatial warp knitted honeycomb structure as shown in FIG. 21 was knitted on a double needle bar Raschel machine of 18 g equipped with five guide bars. Threading of the guide bars is tabulated in Table 6 and notations for controlling the guide bars are tabulated in Table 7. A spatial warp knitted honeycomb structure thus obtained had hexagonal cells each consisting of two band structures each consisting of two opposite two bonded wales each having four loops, and four band structures each consisting of two opposite wales each having three loops as illustrated in FIG. 21.

TABLE 6

| Guide bars | Threading | Yarn type (denier/filaments) |
|---|---|---|
| $L_1$ | Insert warp threads | Polyester 1000/120 |
| $L_2$ | Insert warp threads | Polyester 1000/120 |
| $L_3$ | Uniting threads | Polyester 300/48 |
| $L_4$ | Insert warp threads | Polyester 1000/120 |
| $L_5$ | Insert warp threads | Polyester 1000/120 |

TABLE 7

| Guide bars | Notations | Setting |
|---|---|---|
| $L_1$ | \|88\|88\|00\|00\|88\|88\|00\|00\|88\|88\|00\| 00\|88\|88\|44\|44\|1212\|1212\|88\|88\| 1212\|1212\|88\|88\|1212\|1212\|88\|88\| | 1 in, 1 out |
| $L_2$ | \|00\|00\|44\|44\| | All In |
| $L_3$ | \|02\|20\| | All In |
| $L_4$ | \|00\|44\|44\|00\| | All In |
| $L_5$ | \|88\|44\|44\|1212\|1212\|44\|44\|1212\|1212\| 44\|44\|1212\|1212\|44\|44\|88\|88\|00\|00\| 88\|88\|00\|00\|88\|88\|00\|00\| | 1 in, 1 out |

Example 7

Another spatial warp knitted honeycomb structure represented by a notation shown in FIG. 25 was knitted on a double needle bar Raschel machine equipped with seven guide bars.

The guide bars $L_1$, $L_2$, $L_3$, $L_5$, $L_6$, and $L_7$ were threaded with 1800 denier carbon filament yarns, while the guide bar $L_4$ was threaded with 200 denier polyaramide filament yarns. The guide bars $L_2$ and $L_6$ were threaded and controlled for inserting two bonding insert warp threads in each bonded part, while the guide bars $L_1$, $L_3$, $L_5$, and $L_7$ were threaded and controlled for inserting four insert warp threads in each unbonded part. As spatial warp knitted honeycomb structure thus obtained was impregnated with an epoxy resin, then the resin-impregnated spatial warp knitted honeycomb structure was heated at 120° C. for 180 minutes to harden the epoxy resin. Thus, a lightweight composite structure having a honeycomb structure and a high compressive strength (resistance against stress in the direction of A in FIG. 21) was obtained.

Example 8

Figure 39:
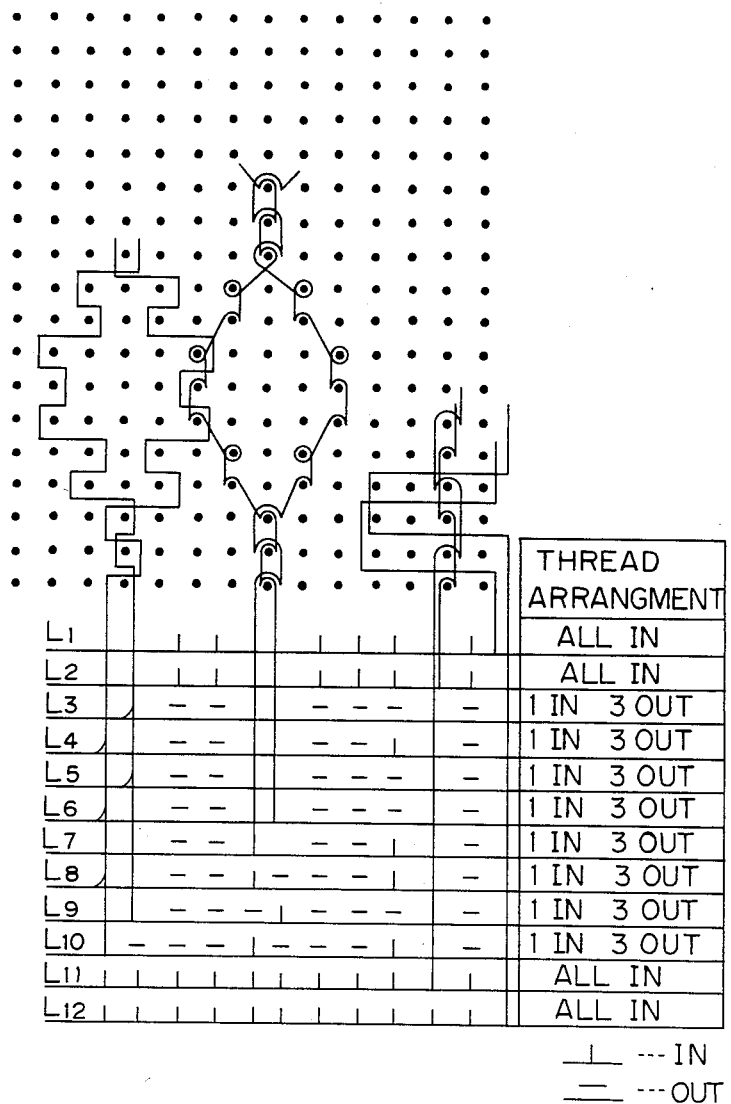
FIG. 39 shows a notation of a spatial warp knitted structure described in Example 8 embodying the present invention.

A spatial warp knitted sandwiched honeycomb structure having a structure represented by a notation shown in FIG. 39 was knitted on a double needle bar Raschel machine equipped with 12 guide bars. The threads used for knitting the spatial warp knitted sandwiched honeycomb structure and guide bar setting are tabulated in Table 8.

A very lightweight spatial warp knitted sandwiched honeycomb structure as illustrated in FIG. 29 having a thickness of 15 mm was obtained.

TABLE 8

| Guide bars | Threading | Type of yarn | Setting |
|---|---|---|---|
| $L_1$ | Warp threads | Polyaramide filament yarn 1200d | \| \| \| \| \| \| \| \| |
| $L_2$ | Warp threads | Polyaramide filament yarn 190d | \| \| \| \| \| \| \| \| |
| $L_3$ | Insert warp threads | Polyaramide filament yarn 2400d | x x x \| x x x \| x |
| $L_4$ | Insert warp threads | Polyaramide filament yarn 2400d | \| x x x \| x x x \| |
| $L_5$ | Insert warp threads | Polyaramide filament yarn 2400d | x x x \| x x x \| x |
| $L_6$ | Uniting threads | Polyaramide filament yarn 380d | \| x x x \| x x x \| |
| $L_7$ | Uniting threads | Polyaramide filament yarn 380d | x x x \| x x x \| x |
| $L_8$ | Insert warp threads | Polyaramide filament yarn 2400d | \| x x x \| x x x \| |
| $L_9$ | Insert warp threads | Polyaramide filament yarn 2400d | x \| x x x \| x x x |
| $L_{10}$ | Insert warp threads | Polyaramide filament yarn 2400d | \| x x x \| x x x \| |
| $L_{11}$ | Warp threads | Polyaramide filament yarn 190d | \| \| \| \| \| \| \| \| |
| $L_{12}$ | Warp threads | Polyaramide filament yarn 1200d | \| \| \| \| \| \| \| \| |

Note: x: Out, |: In

Example 9

Figure 40:
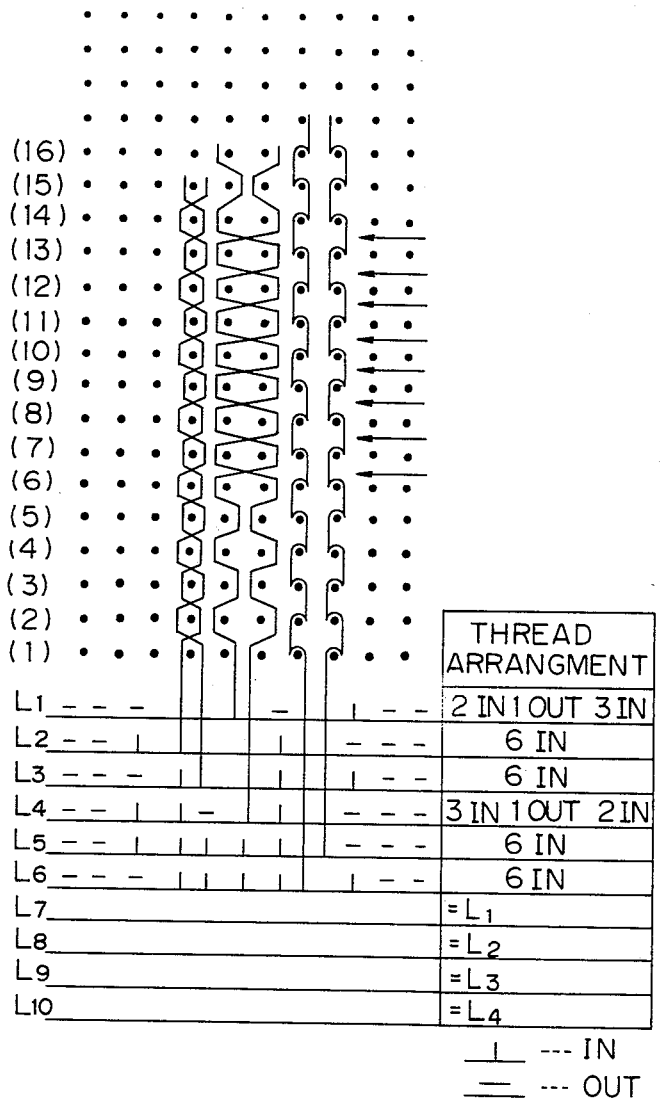
FIG. 40 shows a notation of a spatial warp knitted structure described in Example 9 embodying the present invention.

A spatial section spatial warp knitted structure having an I-shaped section was knitted in a construction represented by a notation shown in FIG. 40 on a double needle bar Raschel machine of 10 g equipped with 10 guide bars. The guide bars $L_5$ and $L_6$ were threaded with 570 denier polyaramide filament yarns for uniting threads and loops, while the guide bars $L_1$ to $L_4$ and $L_7$ to $L_{10}$ were threaded with 3800 denier carbon filament yarns for insert warp threads. The edges of the guide eyes of the guide reeds and the edge of the trick plate were rounded in a radius of 0.3 mm. Insert weft threads were inserted across the width of the spatial warp knitted structure before forming a seventh course to a 14th, respectively, by means of a weft inserting device. A spatial warp knitted band structure thus knitted was impregnated with an epoxy resin, then the resin-impregnated structure was opened along the unbonded wales in an I-shape, and then the same was hardened by heating.

Example 10

Figure 32:
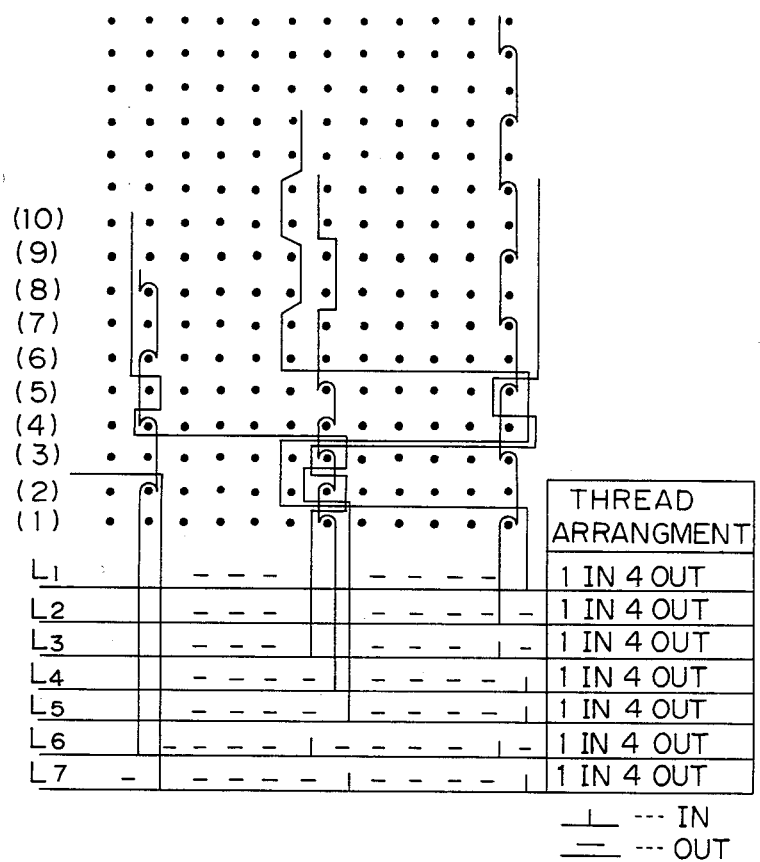
FIG. 32 shows a notation of a spatial warp knitted skeleton structure embodying the present invention.
Figure 33:
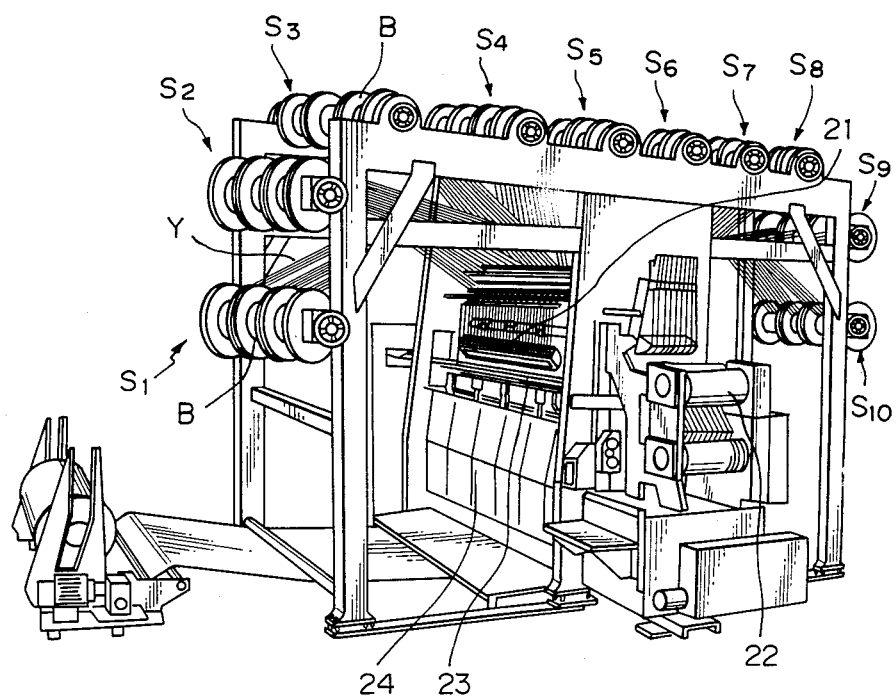
FIG. 33 is a general perspective view of a spatial warp knitting machine according to the present invention.
Figure 34:
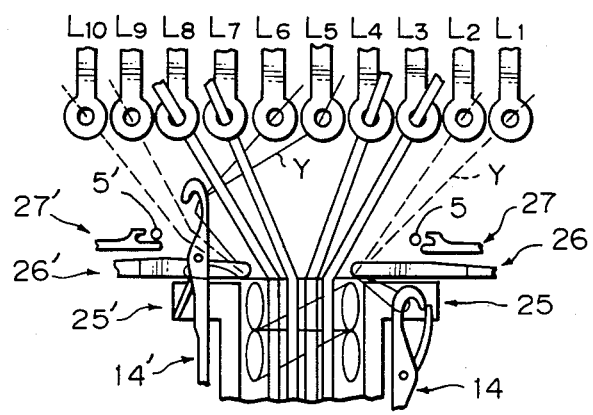
FIG. 34 is a schematic illustration of the knitting section of double needle bar warp knitting machine.
Figures 35A, 35B:
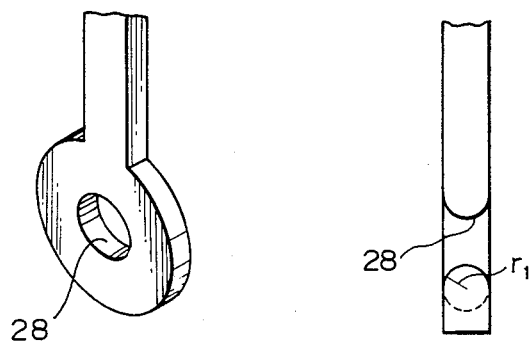
FIGS. 35a and 35b are a perspective view and an elevation showing the tip of a layer guide.
Figure 36:
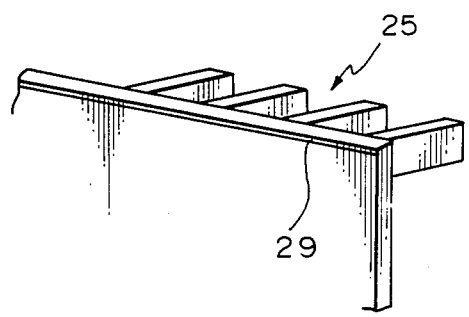
FIG. 36 is a fragmentary perspective view of a trick place.
Figure 37A:
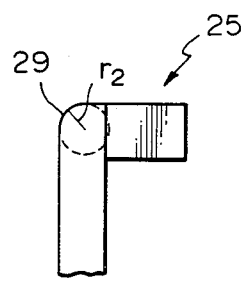
FIG. 37a is a schematic side elevation of a trick plate of a spatial warp knitting machine according to the present invention.
Figure 37B:
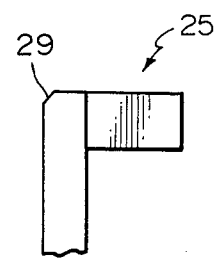
FIG. 37b is a schematic side elevation of a trick plate of a conventional warp knitting machine.

A spatial warp knitted skeleton structure was knitted in a construction represented by a notation shown in FIG. 32 on a double needle bar Raschel machine of 8 g equipped with seven guide bars. The guide bars $L_1$ and $L_7$ were threaded with 2400 denier polyaramide filament yarns for bonding threads for bonding the wales, the guide bars $L_2$ and $L_6$ were threaded with 570 denier polyaramide filament yarns for loops, the guide bar $L_4$ was threaded with 570 denier polyaramide filament yarns for loops and uniting threads, and the guide bars $L_3$ and $L_5$ were threaded with 2400 denier polyaramide filament yarns for insert warp threads. Four uniting threads were provided in each uniting part. A spatial warp knitted skeleton structure similar to that shown in FIG. 31 was obtained.

We claim:

1. A spatial warp knitted structure comprising two warp knitted fabrics each consisting of at least two wales of loops, said two warp knitted fabrics facing each other and united together by uniting parts each having at least one uniting thread; and at least four rows of insert warp threads inserted between and in parallel to the warp knitted fabrics across the uniting threads, and at lease one row of insert weft threads between the adjacent rows of insert warp threads.

2. A spatial warp knitted structure according to claim 1, wherein the adjacent wales of each warp knitted fabric are bonded to each other.

3. A spatial warp knitted structure comprising two warp knitted fabrics each consisting of at least two wales of loops, said two warp knitted fabrics facing each other and united together with uniting threads; and insert warp threads and insert weft threads inserted between and in parallel to the warp knitted fabrics so as to be interlaced with the uniting threads in a woven construction.

4. A spatial warp knitted band structure comprising two warp knitted fabrics each consisting of at least two wales of loops, said warp knitted fabrics facing each other and united together with uniting threads; and insert warp threads inserted between and in parallell to the two warp knitted fabrics so as to be interlaced with the uniting threads in a woven construction, and having a band-like shape of which the narrow sides are formed as a looplike construction and of which the wide sides are formed as a wovenlike construction.

5. A spatial warp knitted band structure according to claim 4, wherein the insert warp threads are interlaced with the uniting threads so that the spatial warp knitted band structure is partly split along a plane perpendicular to the two warp knitted fabrics and parallel to the wales, whereby the spatial warp knitted band structure can be transformed after being knitted into a morphology having an I-shaped section 6. A spatial warp knitted band structure according to claim 4, wherein the insert warp threads are interlaced with the uniting threads so that the spatial warp knitted band structure in partly split along a plane perpendicular to the two warp knitted fabrics and parallel to the wales, whereby the spatial warp knitted band structure can be transformed after being knitted into morphology having a T-shaped section.

7. A spatial warp knitted band structure according to claim 4, wherein the insert warp threads are interlaced with the uniting threads so that the spatial warp knitted band structure is partly split along a plane perpendicular to the two warp knitted fabrics and parallel to the wales, whereby the spatial warp knitted band structure can be transformed after being knitted into a morphology having a Y-shaped section.

8. A spatial warp knitted band structure according to claim 4, wherein the insert warp threads are interlaced with the uniting threads so that an arrangement of a plurality of said insert warp threads on a plane perpendicular to the uniting threads is a honeycomb shape.

9. A spatial warp knitted structure according to claim 3, wherein the two warp knitted fabrics are warp knitted honeycomb fabrics.

10. A spatial warp knitted structure according to claim 3, wherein the two warp knitted fabrics are united along the corresponding opposite sides thereof by woven constructions formed by interlacing the insert warp threads with the uniting threads, in a hollow bar-shaped morphology having a rectangular cross-section.

11. A spatial warp knitted structure according to claim 3, wherein the two warp knitted fabrics are united by woven constructions formed by interlacing the insert warp threads with the uniting threads and distributed in parallel to each other at intervals, in a hollow board-shaped morphology having a segmental rectangular cross section.

12. A spatial warp knitted structure according to claim 3, wherein the two warp knitted fabrics each are formed by interconnecting separate wales formed at intervals along the direction of the course with in-laid threads at intervals along the direction of the wale so as to form a skeleton structure.

13. A spatial warp knitted structure according to claim 3, wherein the two warp knitted fabrics each are formed by interconnecting separate wales formed at intervals along the direction of the course and same wales formed at intervals along the direction of the wales with the uniting threads so as to form a skeleton structure.

14. A spatial warp knitted structure comprising two warp knitted fabrics each consisting of at least two wales of loops, said warp knitted fabrics facing each other and united together with uniting threads; and insert warp threads inserted between and in parallel to the warp knitted fabrics so as to be interlaced with the uniting threads in a woven construction.

15. A spatial warp knitted band structure according to claim 4, wherein the insert warp threads are interlaced with the uniting threads so that the spatial warp knitted band structure is partly split along a plane parallel to the two warp knitted fabrics, and whereby the spatial warp knitted band structure can be transformed after being knitted into a morphology having an I-shaped section.

16. A spatial warp knitted band structure according to claim 4, wherein the insert warp threads are interlaced with the uniting threads so that the spatial warp knitted band structure is partly split along a plane parallel to the two knitted fabrics, whereby the spatial warp knitted band structure can be transformed after being knitted into a morphology having a T-shaped section.

17. A spatial warp knitted band structure according to claim 4, wherein the insert warp threads are interlaced with the uniting threads so that the spatial warp knitted band structure is partly split along a plane parallel to the two warp knitted fabrics, whereby the spatial warp knitted band structure can be transformed after being knitted into a morphology having a Y-shaped section.

18. A spatial warp knitted structure according to claim 14, wherein the two warp knitted fabrics each are formed by interconnecting separate wales formed at intervals along the direction of the course with in-laid threads at intervals along the direction of the wale so as to form a skeleton structure.

* * * * *